Figure 28:
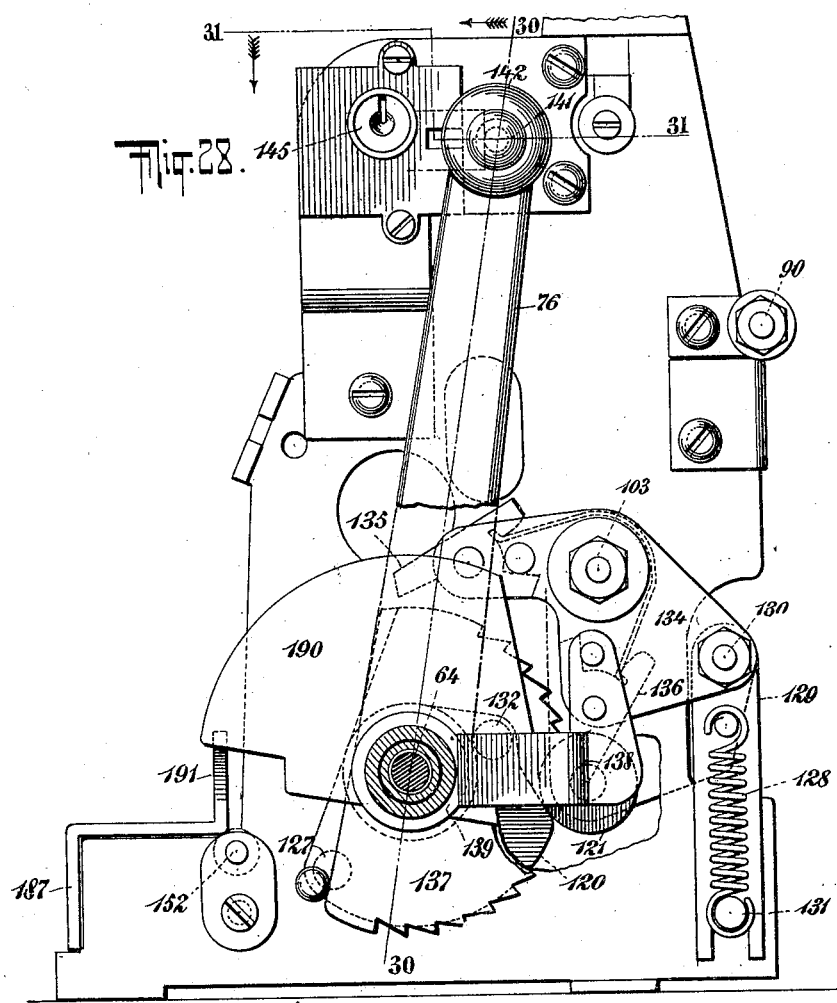

No. 677,896. Patented July 9, 1901.
E. S. SMITH & H. GILES.
CASH REGISTER.
(Application filed Oct. 3, 1900.)
(No Model.) 13 Sheets—Sheet 1.
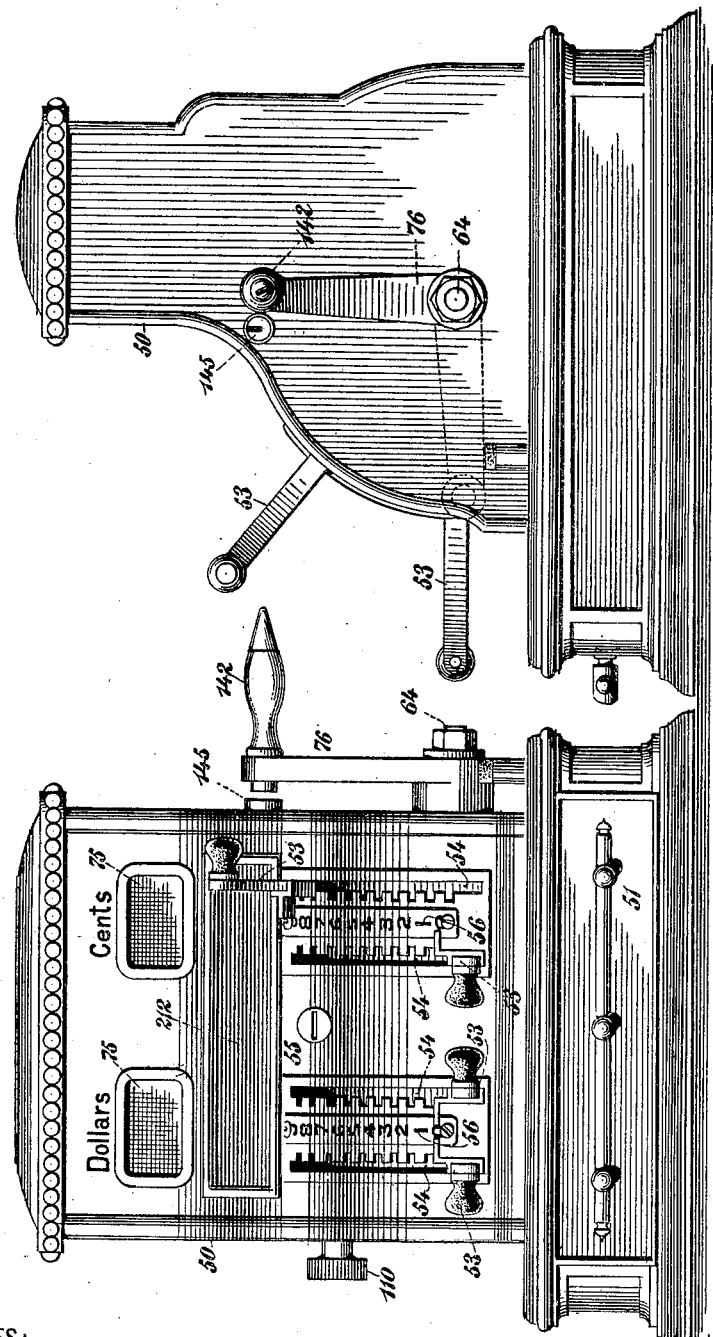
WITNESSES:
Gustave Dieterich
John Kehlenbeck
INVENTORS,
Elmer S. Smith
Harvey Giles
BY
Chas. O. Gill
ATTORNEY

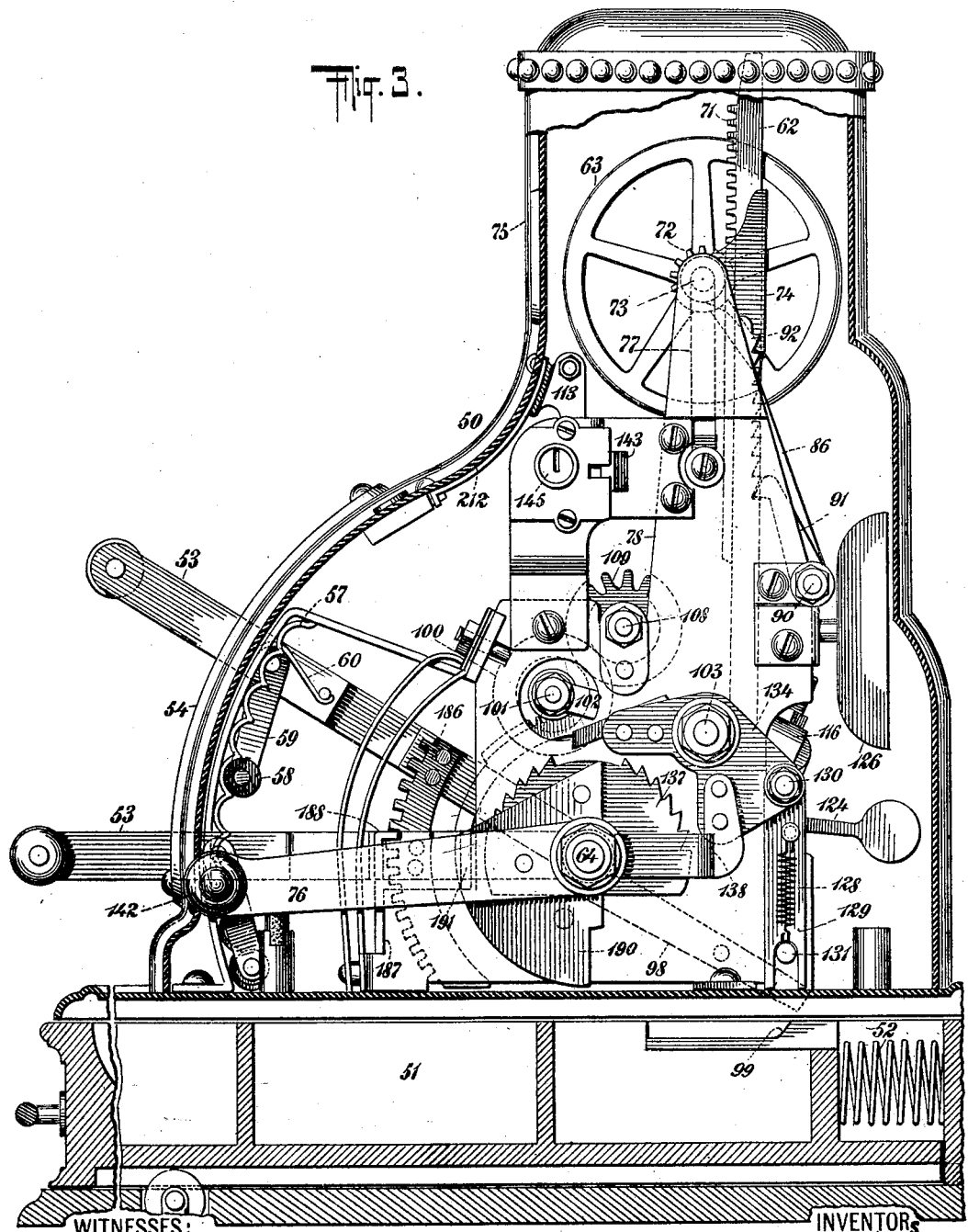

No. 677,896. Patented July 9, 1901.
E. S. SMITH & H. GILES.
CASH REGISTER.
(Application filed Oct. 3, 1900.)
(No Model.) 13 Sheets—Sheet 3.
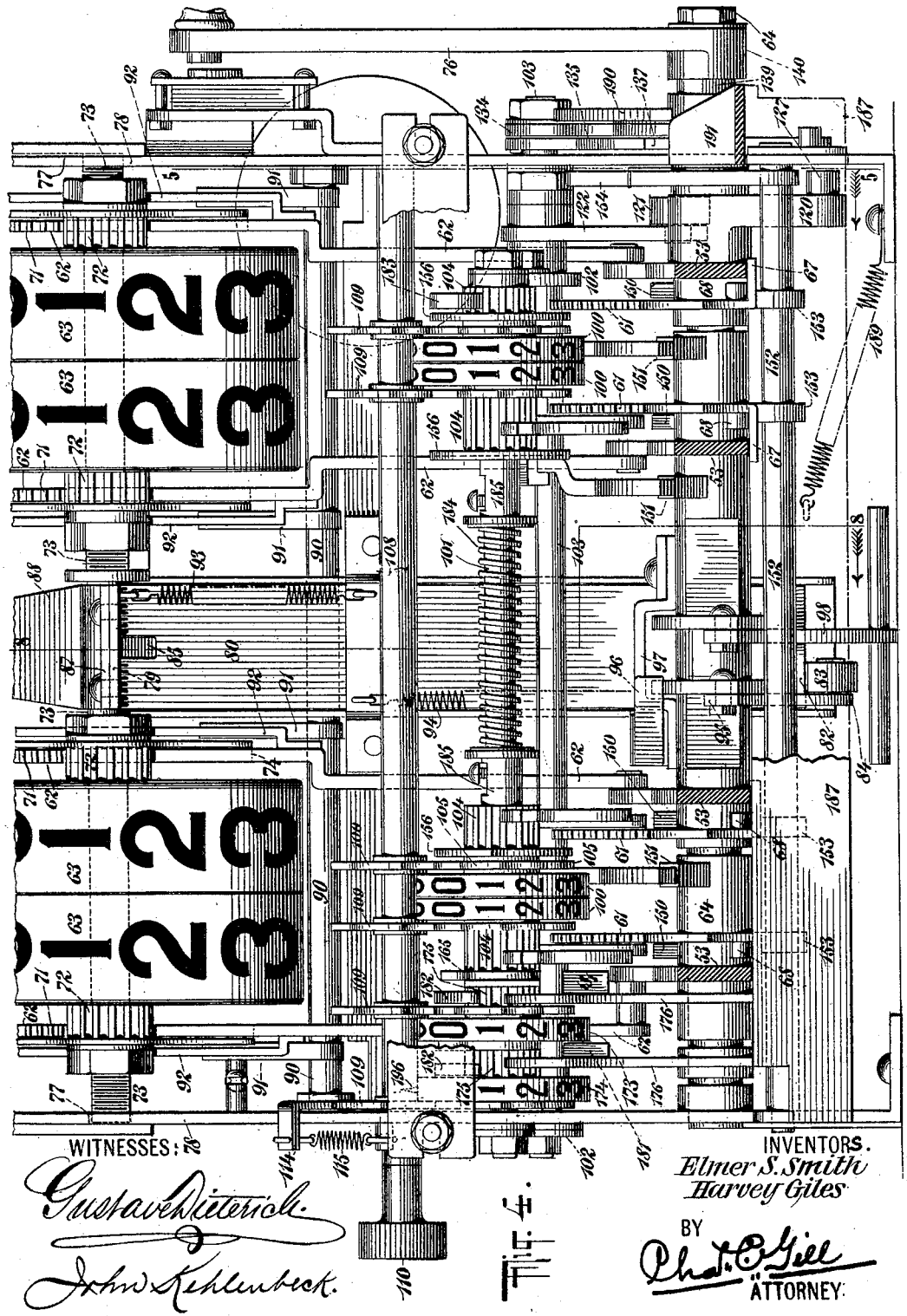
WITNESSES:
Gustave Dieterich
John Kehlenbeck
INVENTORS.
Elmer S. Smith
Harvey Giles
BY
Chas. C. Gill
ATTORNEY No. 677,896. Patented July 9, 1901.
E. S. SMITH & H. GILES.
CASH REGISTER.
(Application filed Oct. 3, 1900.)
(No Model.) 13 Sheets—Sheet 4.
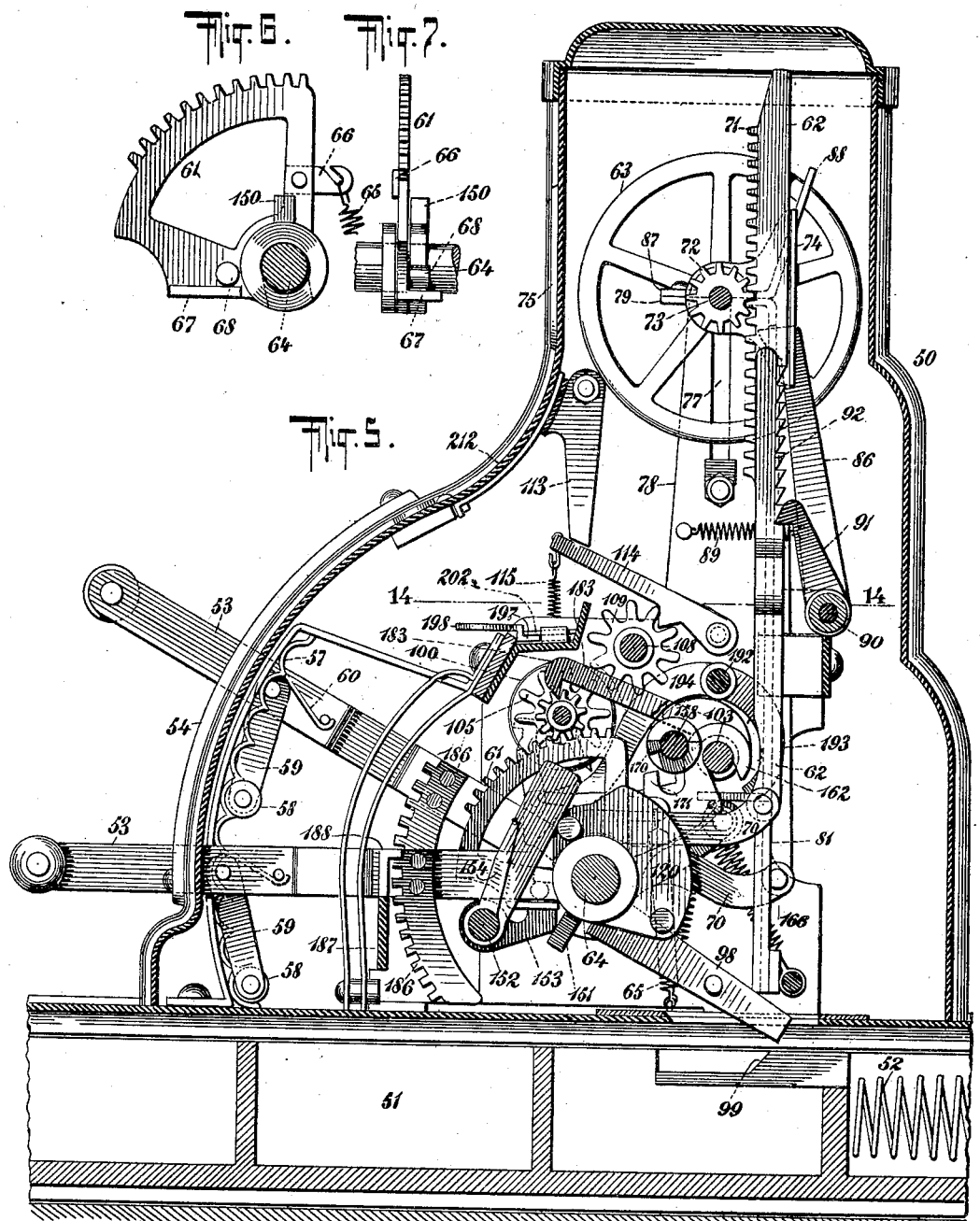
WITNESSES:
Gustave Dieterich
John Kehlenbeck
INVENTORS.
Elmer S. Smith
Harvey Giles
BY
Chas. E. Gill
ATTORNEY No. 677,896. Patented July 9, 1901.
E. S. SMITH & H. GILES.
CASH REGISTER.
(Application filed Oct. 3, 1900.)
(No Model.) 13 Sheets—Sheet 5.
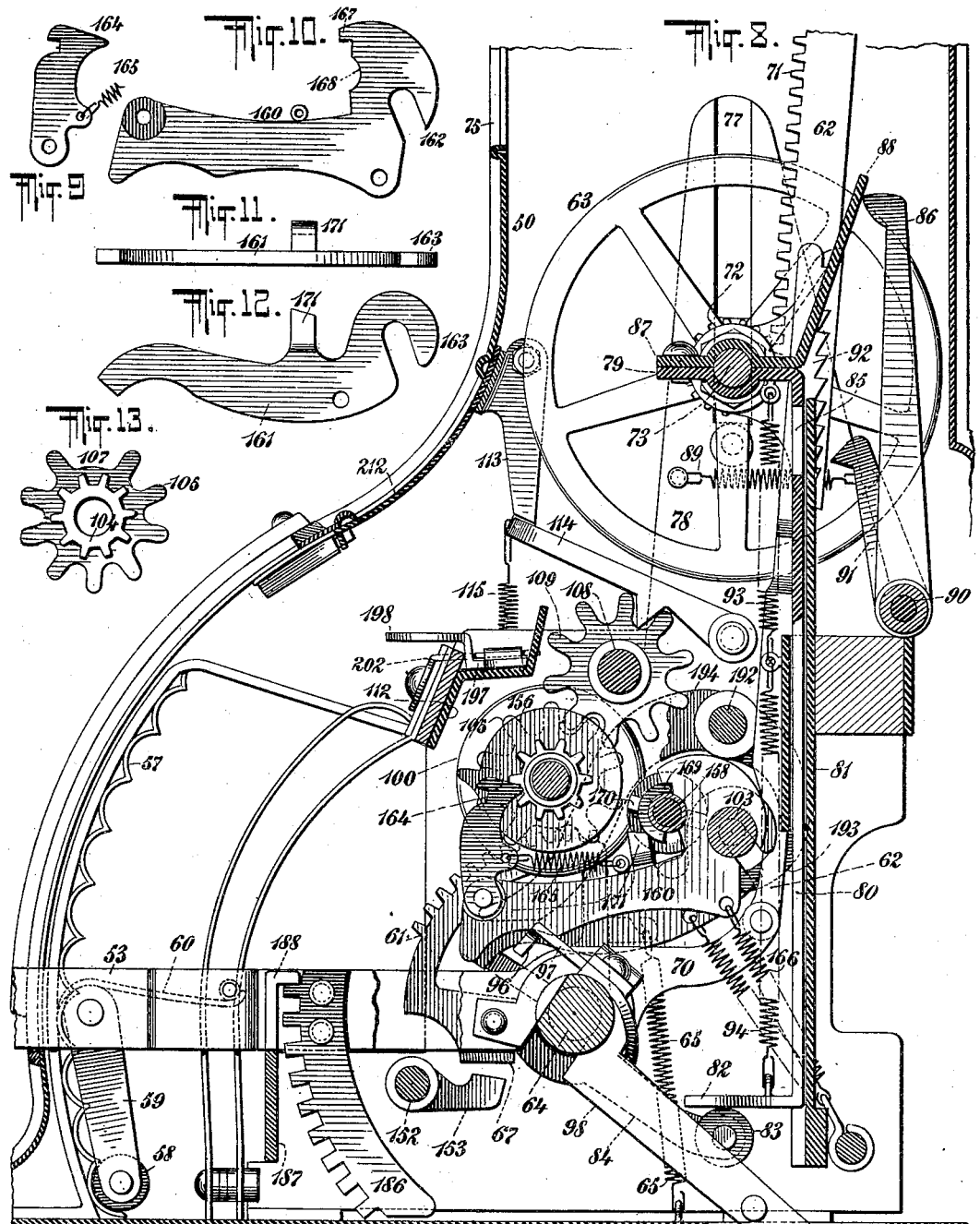
WITNESSES:
Gustave Dieterich
John Kehlenbeck
INVENTORS.
Elmer S. Smith
Harvey Giles
BY
Chas. E. Gill
ATTORNEY
THE NORRIS PETERS CO., PHOTO-LITHO., WASHINGTON, D. C.

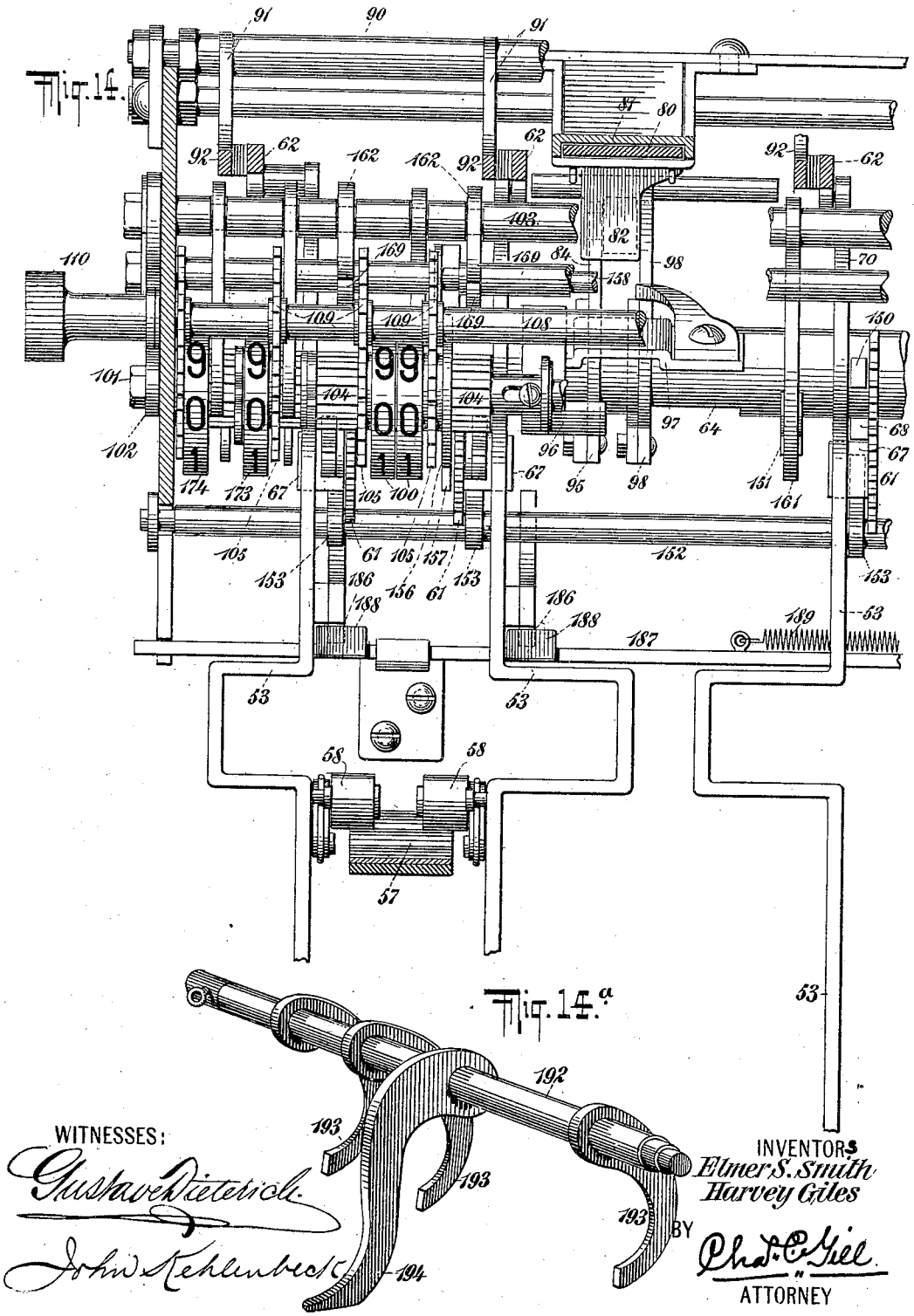

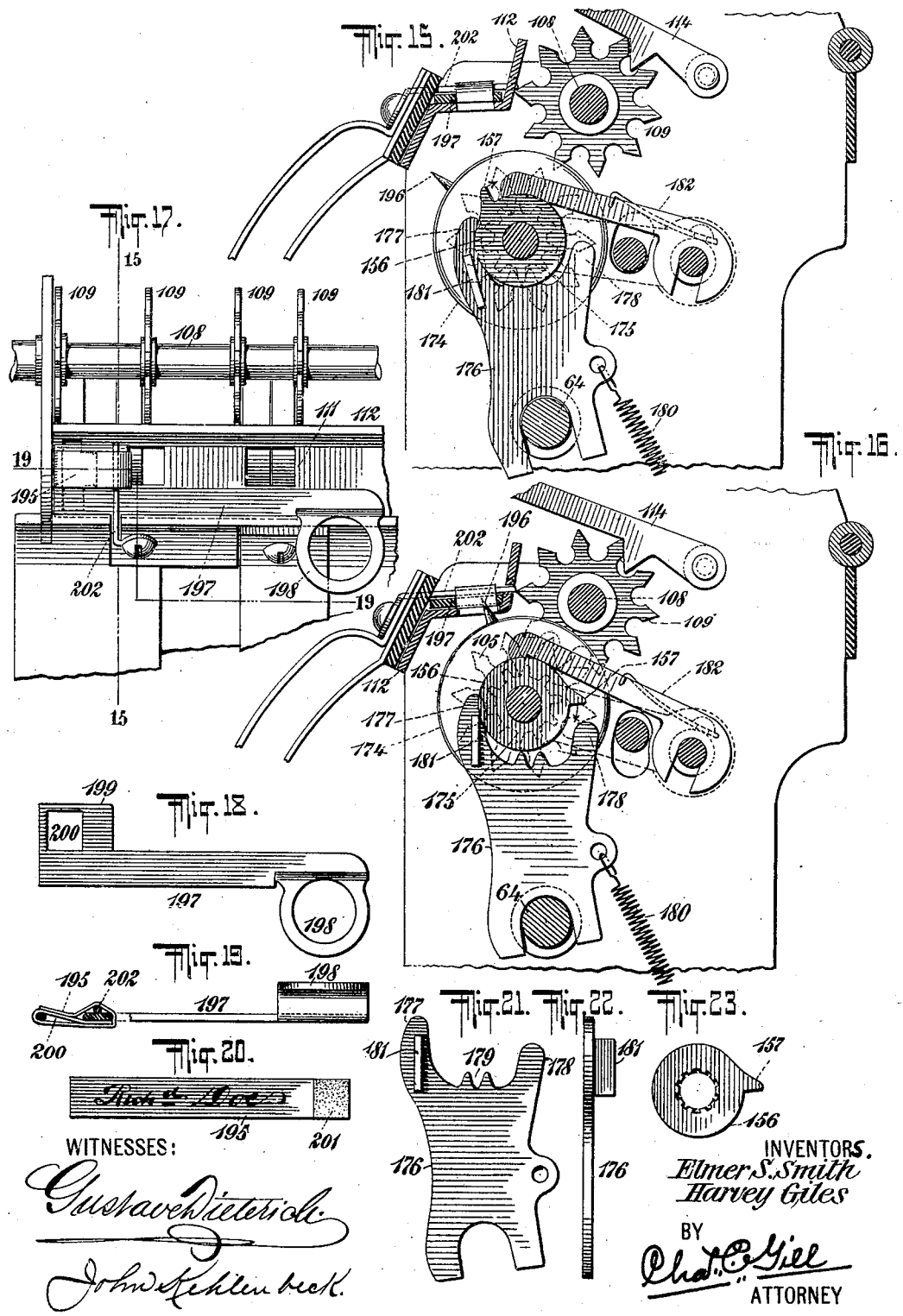

No. 677,896. Patented July 9, 1901.
E. S. SMITH & H. GILES.
CASH REGISTER.
(Application filed Oct. 3, 1900.)
(No Model.)
13 Sheets—Sheet 8.
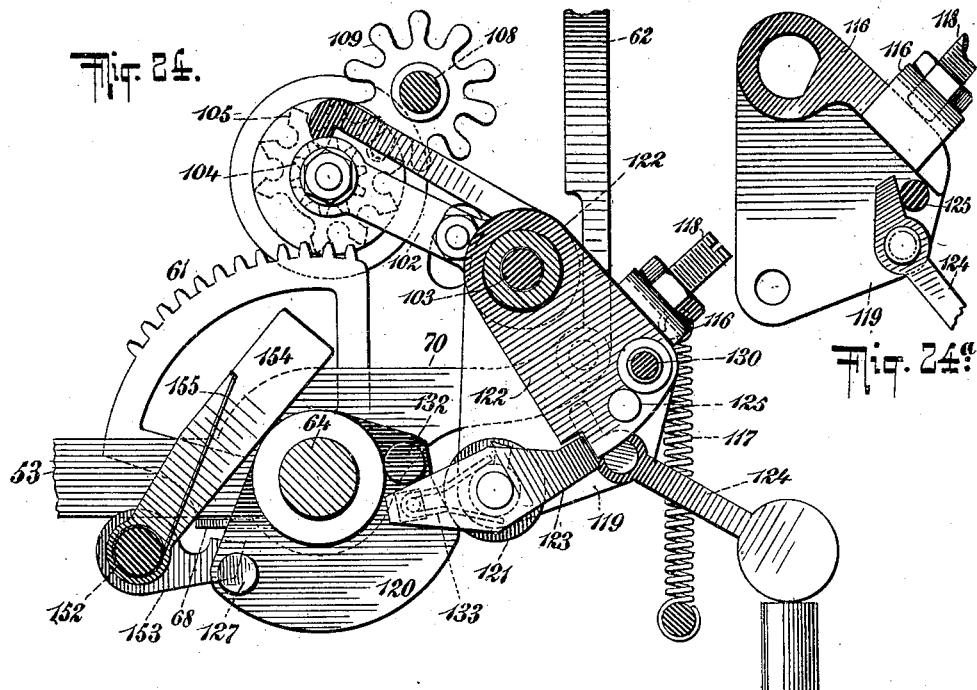
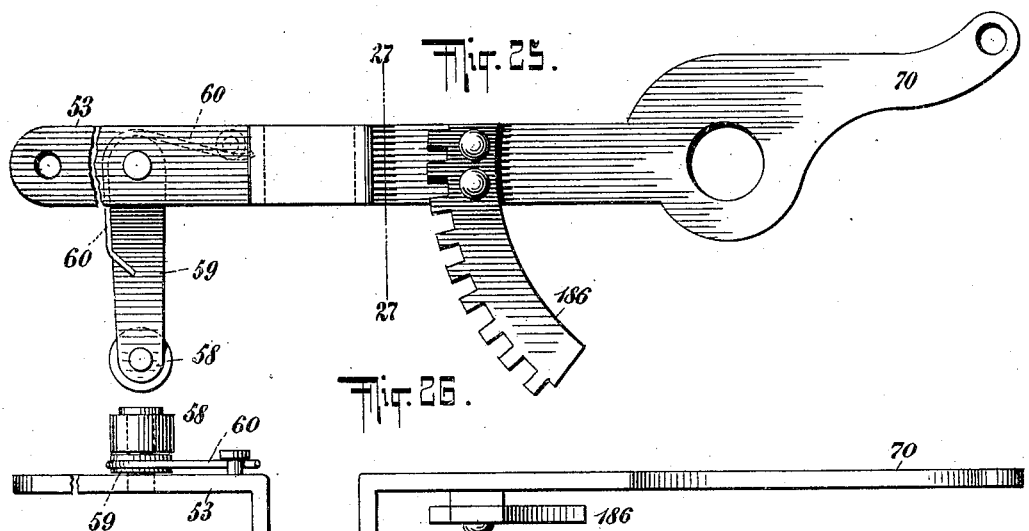
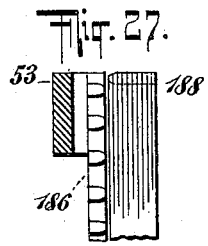
WITNESSES:
INVENTORS.
Elmer S. Smith
Harvey Giles
BY
ATTORNEY.

No. 677,896. Patented July 9, 1901.
E. S. SMITH & H. GILES.
CASH REGISTER.
(Application filed Oct. 3, 1900.)
(No Model.) 13 Sheets—Sheet 9.

WITNESSES:

INVENTORS
Elmer S. Smith
Harvey Giles
BY
ATTORNEY

No. 677,896. Patented July 9, 1901.
E. S. SMITH & H. GILES.
CASH REGISTER.
(Application filed Oct. 3, 1900.)
(No Model.) 13 Sheets—Sheet 10.
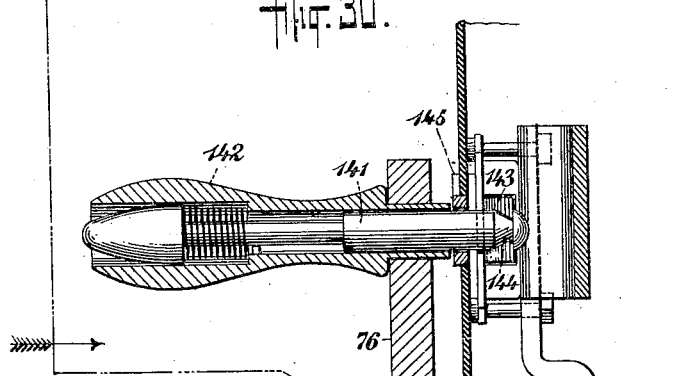
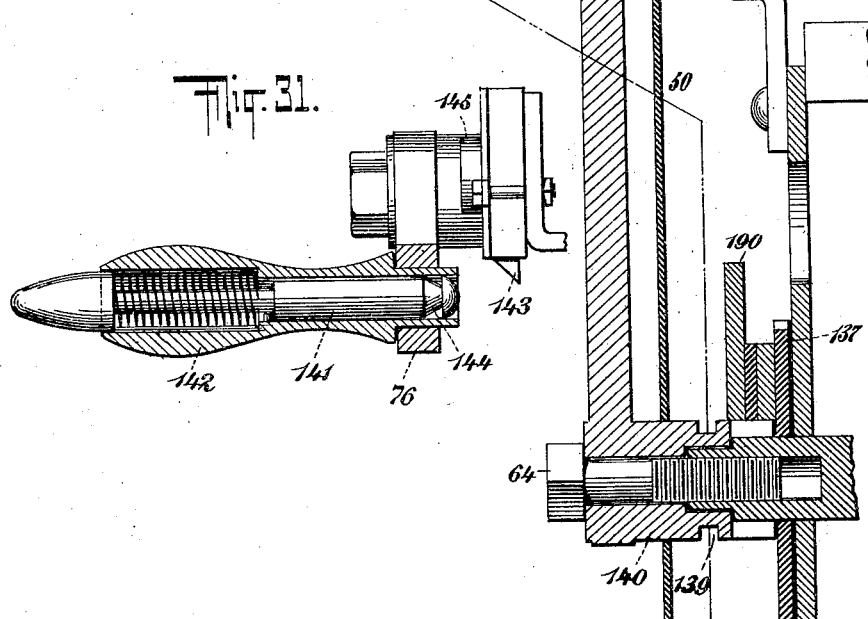
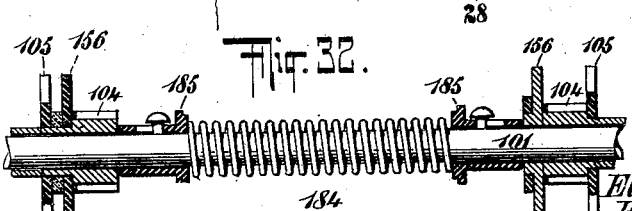
WITNESSES:
Gustave Dieterich.
John Kehlenbeck.
INVENTORS
Elmer S. Smith
Harvey Giles
BY Chas. C. Gill
ATTORNEY.

No. 677,896. Patented July 9, 1901.
E. S. SMITH & H. GILES.
CASH REGISTER.
(Application filed Oct. 3, 1900.)
(No Model.) 13 Sheets—Sheet 11.
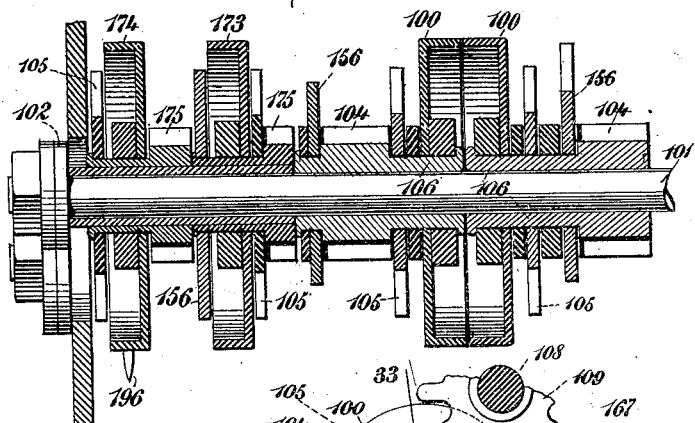
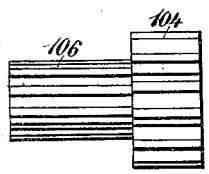
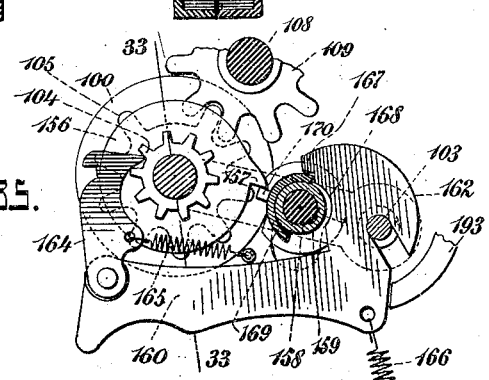
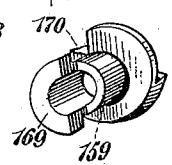
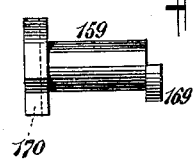
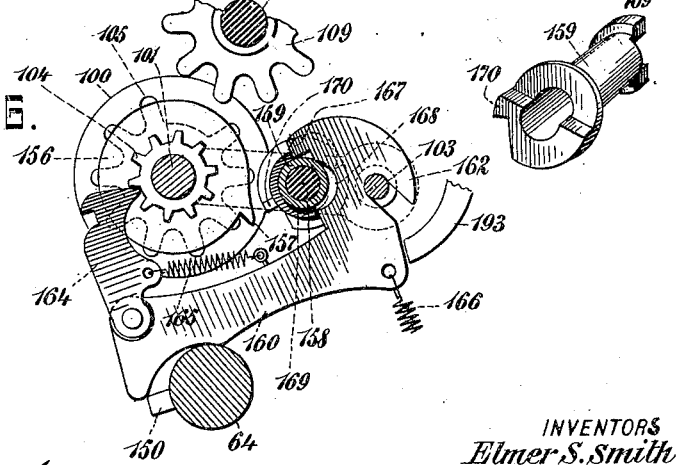
WITNESSES:
INVENTORS
Elmer S. Smith
Harvey Giles
BY
"ATTORNEY No. 677,896. Patented July 9, 1901.
E. S. SMITH & H. GILES.
CASH REGISTER.
(Application filed Oct. 3, 1900.)
(No Model.) 13 Sheets—Sheet 12.
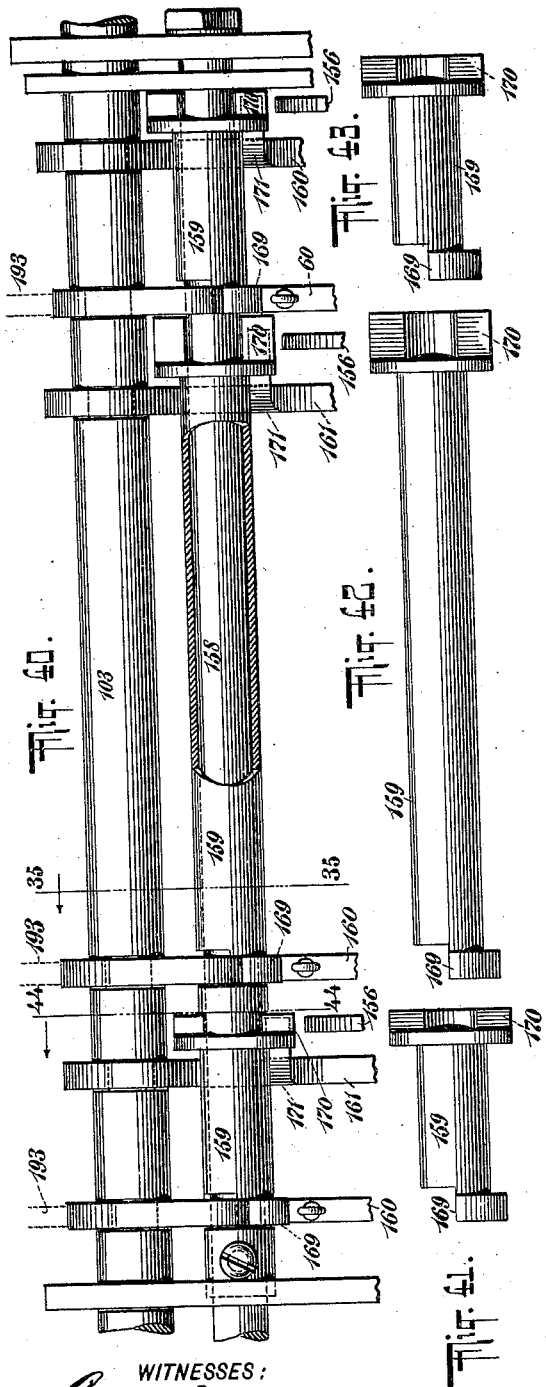
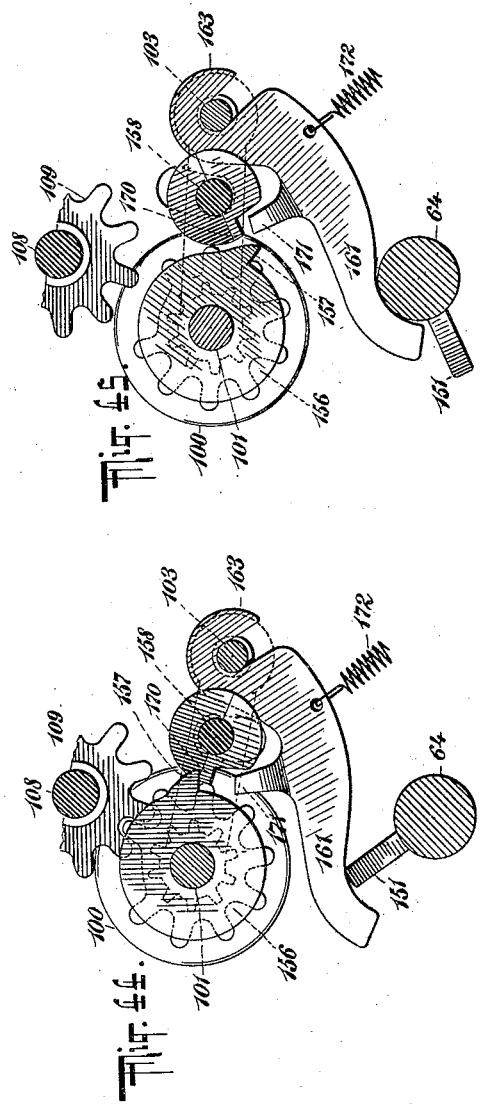
WITNESSES:
Gustave Dieterich
John Kehlenbeck
INVENTORS
Elmer S. Smith
Harvey Giles
BY
Chas. C. Gill
ATTORNEY
THE NORRIS PETERS CO., PHOTO-LITHO., WASHINGTON, D. C.

No. 677,896. Patented July 9, 1901.
E. S. SMITH & H. GILES.
CASH REGISTER.
(Application filed Oct. 3, 1900.)
(No Model.) 13 Sheets—Sheet 13.

WITNESSES:
Gustave Dieterich
John Kehlenbick

INVENTORS
Elmer S. Smith
Harvey Giles
BY Chas. C. Gill
ATTORNEY

THE NORRIS PETERS CO., PHOTO-LITHO., WASHINGTON, D. C.

United States Patent Office.

ELMER S. SMITH, OF BOUNDBROOK, AND HARVEY GILES, OF SOUTH BOUND-BROOK, NEW JERSEY, ASSIGNORS TO THE IDEAL CASH REGISTER COMPANY, OF NEW BOUNDBROOK, NEW JERSEY.

CASH-REGISTER.

SPECIFICATION forming part of Letters Patent No. 677,896, dated July 9, 1901.

Application filed October 3, 1900. Serial No. 31,860. (No model.)

*To all whom it may concern:*

Be it known that we, ELMER S. SMITH, a resident of Boundbrook, and HARVEY GILES, a resident of South Boundbrook, Somerset county, New Jersey, citizens of the United States, have invented certain new and useful Improvements in Cash-Registers, of which the following is a specification.

The invention relates to improvements in cash-registers; and it consists in the novel features, structure, and combinations of parts hereinafter described and claimed.

In accordance with our invention the operator moves the exposed actuating or setting levers along the lines of numerals provided upon the front face of the register-casing for the purpose of setting certain interior segments into proper operative relation to the registering mechanism, and thereafter the operator by moving an exposed crank or handle places the gearing of the registering mechanism into direct engagement with said segments and effects the movement of said segments to their normal position, whereby said segments are caused to operate the registering mechanism to the extent desired and governed by the position given to said segments by the said actuating or setting levers. The aforesaid segments are free on their shaft and under the influence of springs automatically follow the said actuating or setting levers as the same are moved upward along the lines of numerals provided upon the front face of the register-casing. The upward motion of the actuating or setting levers not only sets the aforesaid segments, but also, through intermediate mechanism, sets the indicating cylinders or drums, the latter at such time being substantially concealed within the register-casing. The indicating cylinders or drums are vertically movable and are turned by the actuating or setting levers when in their lower position. The downward pull of the crank-handle for effecting the operation of the register mechanism sets in motion the means for elevating the indicating cylinders or drums to their upper or exposure position, whereby upon the registration being effected the indication on said cylinders or drums becomes exposed to the customer. The movement of the exposed crank or handle whereby registration is effected and the exposure of the indicating cylinders or drums is secured also through the intermediate mechanism effects the ringing of the bell or gong within the register-casing, said gong not sounding until registration has been effected. We provide within the register means for locking the actuating or setting levers after they have once been moved until the registration has been effected and the exposed crank or handle has been returned to its initial normal position, and we also provide means to compel the operator to always give the said exposed crank or handle its full downward movement from its initial normal position to the stop limiting its throw and then back to its first or initial position. We also provide within the register-casing convenient means for permitting the carrying from one register-wheel to another and also means for puncturing a piece of paper or other fabric when the machine has been operated to a predetermined limit for the capacity of the final registering-wheel.

The register-casing is provided with a suitable cash-drawer, a locking device for locking the drawer in its closed position, and a spring for driving said drawer into an open position upon the release of the said locking device.

The nature of the invention and satisfactory means for carrying the same into effect are described in full hereinafter and are illustrated in the accompanying drawings, in which—

Figure 1 is a front elevation of a cash-register constructed in accordance with and embodying the invention. Fig. 2 is an end view of the same and illustrates the exposed crank or handle, by which registration and indication are effected in its normal upright position by full lines and in its lower horizontal position by dotted lines, said crank or handle when registration and indication are desired being pulled from its normal upright position, shown by full line, to its lower horizontal position, indicated by the dotted lines.

Figure 29:
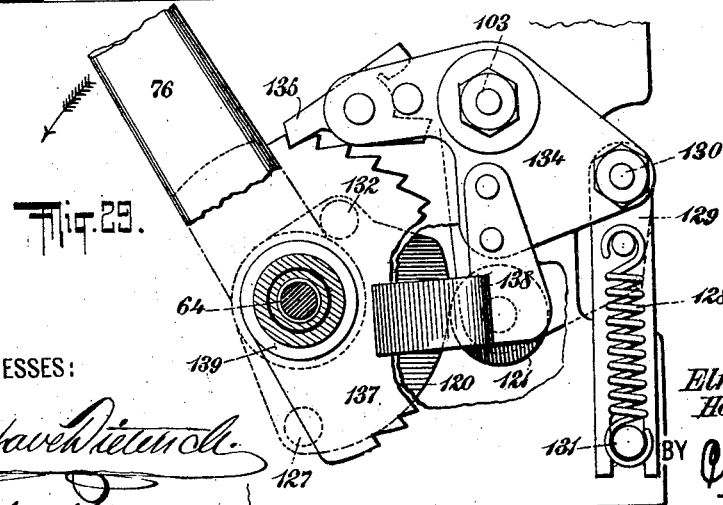
Figure 46:
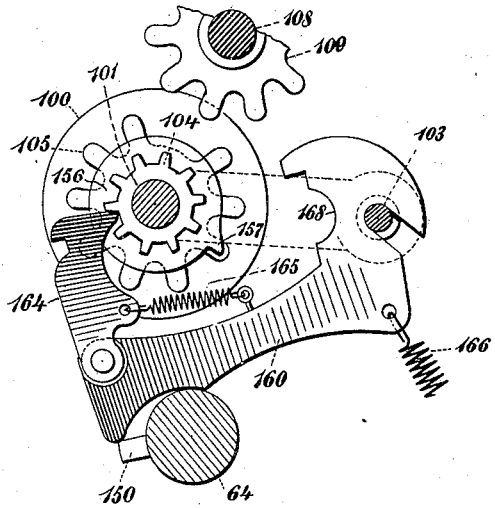
Figure 47:
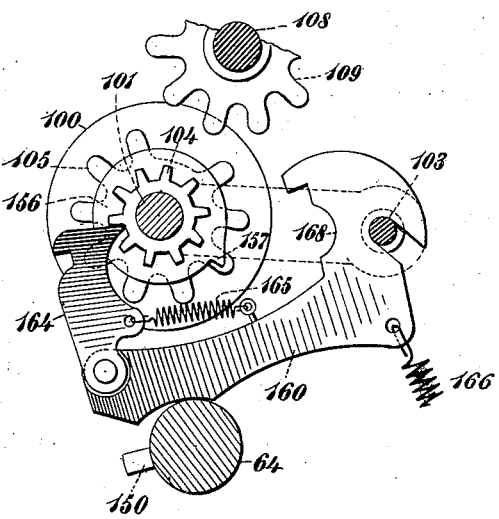
Figure 48:
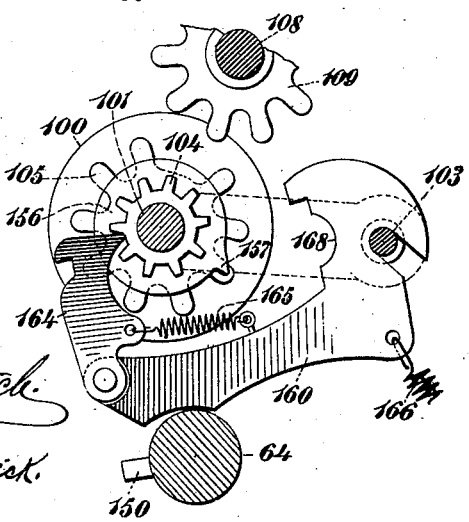

Fig. 3 is a vertical longitudinal section, partly broken away, through the casing and cash-drawer of the register and illustrates the interior mechanism of the register in an end view. Fig. 4 is a front elevation, partly broken away, of the interior mechanism of the register, the register-casing being omitted and the indicating cylinders or drums being shown in their lower or concealed position. Fig. 5 is a vertical transverse section through the register of the dotted line 5 5 of Fig. 4, and in Fig. 5 the indicating cylinders or drums are shown in their elevated or exposure position. Fig. 6 is a detached side elevation of one of the interior segments for operating the registering-wheels, the main driving-shaft upon which said segments are mounted being shown in section in Fig. 6. Fig. 7 is a front edge view of same. Fig. 8 is an enlarged vertical transverse section through the register on the dotted line 8 8 of Fig. 4, the indicating cylinders or drums in this figure being shown in their lower or concealed position. Fig. 9 is a side elevation of one of the pawls which has to do with the carrying mechanism and is hereinafter specifically referred to. Fig. 10 is a side elevation of the lever-arm forming a part of the carrying mechanism, to which the pawl shown in Fig. 9 is pivoted. Fig. 11 is a top edge view of a lever-arm which likewise is connected with the carrying mechanism. Fig. 12 is a side elevation of same. Fig. 13 is a side elevation of one of the pinions and one of the setting-back gear-wheels connected with the registering-wheels. Fig. 14 is a horizontal section, partly broken away, of the interior mechanism of the machine on the dotted line 14 14 of Fig 5. Fig. 14$^a$ is a perspective view of a rock-shaft with a rigid lever-arm and three dog-arms connected therewith and forming a part of the interior mechanism of the machine. Fig. 15 is a vertical section through a portion of the machine on the dotted line 15 15 of Fig. 17 and illustrates more particularly the totalizing-wheels, with the means for perforating a piece of paper located within the register at the time the last wheel registers "9." Fig. 16 is a like view of same and illustrates the prong at the figure "9" on the last totalizing-wheel in the act of perforating the piece of paper to indicate to the owner of the register that the register has reached the amount of nine thousand nine hundred and ninety-nine dollars and ninety-nine cents. Fig. 17 is a top view of a portion of the register and looks down upon the top of the mechanism shown in Figs. 15 and 16. Fig. 18 is a detached top view of the plate upon which the paper to be perforated by the last totalizing-wheel is secured and which plate is shown in position in Fig. 17 upon the guard-plate which covers all of the totalizing and registering wheels with the exception of the special line of numerals which is to be read. Fig. 19 is a sectional view of the said plate shown in Fig. 18, the section being on the dotted line 19 of Fig. 17. Fig. 20 is a detached top view of the strip of paper which in use is applied to the end of the plate shown in Figs. 18 and 19 for the purpose of being perforated by the last totalizing-wheel. Fig. 21 is a detached side elevation of a plate employed for operating the totalizing-wheels. Fig. 22 is a front view of same. Fig. 23 is a view of one of the plates located on the registering-wheel shaft and having a projecting finger for effecting the carrying from one registering-wheel to another and from one totalizing-wheel to another. Fig. 24 is a detached end elevation of the mechanism connected with the right-hand end of the main driving-shaft and to be set in motion by said shaft for lowering the gear-wheels of the registering-wheels into mesh with the segments which determine the extent of movement said registering-wheels shall have with each operation of the exposed crank-handle, and in Fig. 24 the main driving-shaft is shown in section and one of the hand setting-levers is shown as partly broken away. Fig. 24$^a$ is a detached side view, partly in section, of a portion of said mechanism. Fig. 25 is an enlarged detached side elevation, partly broken away, of one of the hand setting-levers. Fig. 26 is a top edge view of same. Fig. 27 is a sectional view, partly broken away, of same on the dotted line 27 27 of Fig. 25. Fig. 28 is an enlarged detached end view, partly in section, of the mechanism at the right-hand end of the main driving-shaft adjacent to the exposed crank-handle for locking the lower end of said handle upon the said shaft from within the register-casing, and the means for compelling said handle to make a full downward motion to its horizontal position and then a full upward motion to its upright normal position. Fig. 29 is a like view, partly broken away and partly in section, of the mechanism at the right-hand end of the main driving-shaft, this figure showing the position of some of the parts after the exposed crank-handle has been started downward toward its horizontal position. Fig. 30 is a vertical section through the exposed operating crank-handle and connected parts on the dotted line 30 30 of Fig. 28 and shows the means for locking said handle against operation. Fig. 31 is a horizontal section of same on the dotted line 31 31 of Fig. 28, and in this figure the means illustrated in Fig. 30 for locking the handle stationary are shown in their disengaged positions, leaving the exposed crank-handle free to be operated. Fig. 32 is a detached view, partly in section and partly broken away, of the registering-wheel shaft with the parts carried thereon. Fig. 33 is a longitudinal section through the totalizing-wheels and some of the registering-wheels, with their connected pinion-wheels and other parts, the purpose of this figure being to illustrate the means for mounting the said wheels on the registering-wheel shaft. Fig. 34 is a detached side elevation of one of the pinion-wheels and its fluted sleeve-hub to receive a registering-wheel preparatory to the whole being slipped upon the registering-wheel shaft. Fig. 35 is a detached vertical section through a portion of the register on the dotted line 35 35 of Fig. 40 and illustrates more particularly the relation of the carrying devices to the registering-wheels when the latter are in their elevated normal positions. Fig. 36 is a like view of same, showing the relation of the parts when the crank-handle has been pulled to its lower position and a sleeve on the carrier-shaft has been turned axially to permit the pawl shown in Fig. 36 to turn the registering-wheel a distance equal to one tooth or space when the crank-handle and driving-shaft are turned to their normal position. Fig. 37 is a perspective view of one of the sleeves on the carrier-shaft, taken from the left-hand end of said sleeve. Fig. 38 is a like view of same, taken from the right-hand end of said sleeve. Fig. 39 is a bottom view of same. Fig. 40 is a detached top view, partly broken away, of the carrier-shaft, the sleeves thereon, and the levers for coöperation therewith. Figs. 41, 42, and 43 illustrate in a top view the three carrier-sleeves removed from the carrier-shaft. Fig. 44 is a vertical section through a portion of the register on the dotted line 44 44 of Fig. 40 and illustrates more particularly the means for turning the carrier-sleeve when the register-wheel completes a rotation and the means for restoring said sleeve to its normal position. In Fig. 44 the register-wheel shaft is shown in its upper position. Fig. 45 is a like view of same, showing the register-wheel shaft in its lower position, the carrier-sleeve as having been turned axially from the register-wheel, and the lever in position to restore said sleeve to its normal position on the upward motion of the operating crank-handle; and Figs. 46, 47, and 48 are detached vertical sectional views through the registering-wheel shaft and main driving-shaft and are intended more particularly to denote the difference between the several levers 160, which form a part of the carrying or transfer mechanism, whereby said mechanism operates on the different registering-wheels in series, the lever 160 in Fig. 46 being for carrying to the tens-of-cents registering-wheel, the lever 160 in Fig. 47 being for carrying to the dollars registering-wheel, and the lever 160 in Fig. 48 being for carrying to the tens-of-dollars registering-wheel.

In the drawings, 50 designates the exterior shell or casing of the register, 51 the cash-drawer, and 52 the spring, which is compressed during the closing of the cash-drawer and which when the cash-drawer is released from its locking devices drives said drawer to its open position.

The actuating or setting levers are designated by the numerals 53, and these levers extend frontward through slots 54, formed in the front plate 55 of the register, Fig. 1, which plate is furnished with the columns of numerals 56, ranging from "0" to "9" inclusive. The slots 54 are provided in the front face 55 of the register-casing to admit of the movement of the actuating-levers 53 along the sides of the columns of numerals 56, and at the inner side of the front face 55 are provided the rigidly-secured recessed bars 57, Fig. 3, which coact with the rollers 58 and links 59 to create sufficient friction and resistance to enable the operator to properly control the hand actuating or setting levers 53 during the motion of the latter. The links 59 are pivoted to the actuating-levers 53 and carry the said rollers 58, and said links 59 and rollers 58 are given a pressure toward the bars 57 by means of the spring 60. The recesses formed in the bars 57 are in line with the individual numerals of the columns of numerals 56 on the front face 55 of the register-casing, and said recesses are adapted to receive the said rollers 58 and to aid in retaining levers 53 in any of their various positions along the line of the slots 54.

The spring-pressed rollers 58 and recessed bars 57 yieldingly resist the motion of the actuating-levers 53 and serve to retain said levers in any position along the slots 54 to which they may be moved. The initial position of the actuating-levers 53 is at the lower end of the slots 54, as indicated at the left-hand portion of Fig. 1, and when it is desired to register and indicate the amount of a sale the said levers (one or more, as may be necessary) will be moved upward to proper positions along the line of said slots under the guidance of the columns of numerals 56 on the front plate 55.

The actuating-levers 53 during their upward motion perform two main functions, the first being to "set" the segments 61, and the second being, through the vertical racks 62, to actuate or set the indicating cylinders or drums 63. The segments 61 are loosely mounted upon the main driving-shaft 64 and automatically follow the actuating-levers 53 under the influence of the coiled springs 65, (see Figs. 5, 6, and 8,) whose upper ends are secured to rearwardly-extending arms 66, Fig. 6, formed as a part or secured to said segments 61, and whose lower ends are secured to the flooring or base of the register-casing, as indicated in Figs. 5 and 8.

Each lever 53 is accompanied by a segment 61, and each segment 61 is adapted to have an independent motion and is equipped with a spring 65, and the force of said spring is normally exerted to pull downward on the rearwardly-extending arm 66 of the segments, so as to keep the segments 61 in condition to automatically follow the levers 53 when the latter are elevated. The segments 61 are each formed with the laterally-extending lip 67, Figs. 4 and 6, which affords a surface for contact with the lower edge of the levers 53. Above the lips 67 of the segments 61 the latter are provided with a rigid pin 68, which during the turning upward of the segments 61 to follow the levers 53 under the influence of the springs 65 perform no function whatever; but said pins 68 do come into use during the turning downward to their initial position of said segments 61, as hereinafter explained.

The actuating-levers 53 turn freely upon the shaft 64, and likewise the segments 61 turn freely upon said shaft. The said segments 61 during their return to their frontward and downward position effect, through the means hereinafter described, the registration, and during such return motion said segments leave the actuating-levers 53 in their then upward position.

The actuating-levers 53 are each formed with the rearwardly-extending arm 70, whose rear ends are pivotally secured to the lower ends of the rack-bars 62, hereinbefore mentioned, having along the front edge of their upper portion the teeth 71, in mesh with the pinion-wheels 72, connected with the indicating cylinders or drums 63 and with said indicating cylinders or drums loosely mounted upon the shaft 73, each of said indicating cylinders or drums 63 being furnished with a pinion-wheel 72, and with this pinion-wheel being free to revolve upon the said shaft 73 when actuated by a rack-bar 62, one of the latter being provided for each of said drums. The upward motion of each lever 53 thus effects the proper setting of its coöperating segment 61 and also through a rack-bar 62 the proper turning of its coöperating indicating cylinder or drum 63. The rack-bars 62 have a substantially vertical movement and are guided at their upper portions by the bent plates or saddles 74, which are swung from the shaft 73 and pass around the rear vertical edges of said bars 62. The saddles or guides 74 for the rack-bar 62 may have a limited yielding or turning motion on shaft 73, so that they may give to any irregularity of motion out of a direct vertical line that the rack-bars 62 may have. A saddle or guide 74 is provided for each of the rack-bars 62, since each of said rack-bars is adapted to have an independent vertical motion. The guides or saddles 74 not only operate to sustain and guide the rack-bars 62, but also serve to keep the teeth 71 of said rack-bars in constant mesh with the teeth of the pinion-wheels 72, connected with the indicating cylinders or drums 63.

The indicating cylinders or drums 63 will be numbered from "0" to "9," inclusive, to correspond with the columns of numbers 56 on the front face or plate 55 and also to correspond with the like numerals on the registering-wheels, said indicating cylinders or drums 63 being mounted upon the transverse shaft 73, extending transversely within the upper portion of the register-casing 50 and being adapted, as hereinafter described, to be elevated to a position in line with the window-openings 75, formed in the register-casing, as shown in Fig. 1. The indicating cylinders or drums in accordance with the present invention are capable of being elevated to a position in line with the window-opening 75 to expose the indication therethrough, but are primarily turned to the proper predetermined positions when they are at their lower position, (shown in Figs. 3 and 4,) Fig. 5 illustrating the position of said indicating cylinders or drums when they are in their upper position in line with the window-openings 75. The means for elevating and lowering the indicating cylinders or drums 63 will presently be described. The initial upward motion of the actuating-levers 53 results in the turning of the indicating cylinders or drums 63 to bring into alinement the proper numerals thereon to indicate the amount of a sale; but said numerals are substantially concealed, especially from the customer, until such time as the exposed operating crank-handle 76 is moved to effect registration and the elevation of the said indicating cylinders or drums 63 to their upper position, (shown in Fig. 5,) the proper numerals indicating the amount of the sale when said cylinders or drums 63 are in their upper position being observable through the window-openings 75.

The means for raising and permitting the lowering of the indicating cylinders or drums 63 will now be described. The shaft 73 for the indicating cylinders or drums 63 is mounted in the vertical grooves or slots 77, (see Figs. 5, 8, and 4,) formed in the rigid end frames 78, which support the interior mechanism of the register, and at its central portions said shaft 73 is secured upon the upper forwardly-extending end 79, Fig. 8, of the vertically-movable bar 80, which is guided against the stationary vertical bar 81 and at its lower end is provided with the frontwardly-extending foot 82, the latter being directly over the roller 83 at the rear end of the lever-arm 84, which is loosely hung upon the main driving-shaft 64, which lever-arm 84 when the crank-handle 76 is pulled downward from its vertical position to a horizontal position pushes upward on the said foot 82 and elevates the vertical movable bar 80 to its upper position, (shown in Fig. 5,) the ends of the shaft 73 during such upward movement of said bar 80 sliding upward within the guiding and sustaining slots 77 in the stationary frames 78. The upper portion of the bar 80 is formed with the aperture 85, which when the bar 80 reaches its upper position receives the upper end of the dog 86, which end at such time springs into the said aperture 85 and serves to maintain the bar 80 and indicating cylinders or drums 63 in their upper position, as shown in Fig. 5, after the exposed crank-handle 76 is returned from its horizontal position back to its normal or vertical position and the lever-arm 84 has returned to its lower position, (shown in Fig. 8,) leaving the foot 82 and the bar 80 in their upper position. Upon the upper frontwardly-extending end 79 of the vertical movable bar 80 is fastened the plate 87, (see Fig. 8,) which encompasses the upper side of the central portion of the shaft 73 and is formed with the upwardly rearwardly inclined extension-plate 88, which when the bar 80 is in its lower position keeps the dog 86 pressed rearward against the stress of the coiled spring 89, hereinafter referred to. The only purpose to be accomplished by the dog 86 is upon its entering the aperture 85 in the bar 80 to maintain the bar 80 and the indicating cylinders or drums 63 in their upper exposure position until in the event of a subsequent sale the actuating-levers 53 are moved to carry out the further operation of the machine. The dog 86 will be moved from its engagement with the aperture 85 of the bar 80 the moment any one of the actuating-levers 53 is moved, and when said dog 86 is relieved from the aperture 85 of the bar 80 the latter and the indicating cylinders or drums 63 will descend by gravity to their lower position, (shown in Fig. 8,) preparatory to said cylinders or drums 63 being again rotated to the proper extent to denote the subsequent sale. The lower end of the dog 86 is secured upon the rock-shaft 90 and said dog receives its motion through said rock-shaft, and upon the rock-shaft 90 is secured a series of four auxiliary dogs 91, one being provided for each of the auxiliary rack-bars 92, connected with the main vertical rack-bars 62. Each rack-bar 62 has secured to it one of the auxiliary rack-bars 92, whose form and construction are clearly illustrated in Figs. 4, 7, and 8. The rack-bars 92 being secured to the main rack-bars 62 move with said rack-bars 62, and the said rack-bars 92 are, when the cylinders or drums 63 are in their upper position, engaged by the dogs 91, as shown in Fig. 5, the engagement of the dogs 91 with the racks 92 being when the upper end of the dog 86 is within the aperture 85 formed in the vertically-movable bar 80. The sole purpose of the racks 92 and dogs 91 is to effect from any one of the hand-levers 53 the movement of the upper end of said dog 86 rearward from the said aperture 85 in the vertically-movable bar 80. The end pawl 91 at the right-hand end of the shaft 90 is connected with the spring 89, (shown in Figs. 5 and 8,) and when the bar 80 and cylinders or drums 63 are in their upper position the spring 89 pulling on the end dog 91 will turn the shaft 90 toward the front and cause the upper end of the dog 86 to enter and remain within the aperture 85 in the bar 80. When, however, any one of the actuating-levers 53 is moved, (when the indicating cylinders or drums are in their upper position,) the rack-bar 62 and auxiliary rack-bar 92, connected with the lever 53, will be set in motion, and this movement of the auxiliary rack-bar 92 will have the effect of sliding the teeth of the same against the pawl 91 in engagement therewith, and this sliding of the teeth of the rack-bar 92 against the pawl 91 will cause the said pawl to turn rearward a slight distance equal to the depth of the teeth of the rack-bar 92, thereby turning the shaft 90 rearward and through said shaft 90 turning the dog 86 rearward and withdrawing the upper end of the latter from the said aperture 85 in the vertically-movable bar 80. The withdrawal of the pawl 86 from the aperture 85 of the bar 80 leaves the latter unsupported, and the said bar 80, with the said indicating cylinders or drums 63, will descend by gravity to their lower position. (Shown in Fig. 8.) When the bar 80 and indicating cylinders or drums 63 are in their lower position, the rack-bars 92 will not be engaged by the pawls 91, since at such time the plate extension 88 will operate as a cam to keep the dog 86 pressed rearward and through said dog maintain the dogs 91 clear of the rack-bars 92, as shown in Fig. 8. The main purpose of keeping the dogs 91 clear of the rack-bars 92 when the cylinders 63 are in their lower position is to avoid the noise which would occur during the rotation of said cylinders or drums 63 by the rack-bars 62 should the rack-bars 92 at such time be in engagement with the dogs 91. In order to avoid any rattling or momentum of parts and to effect an easy and uniform action of movement, we provide the coiled springs 93 94, as shown in Fig. 8, the spring 93 being at its upper end connected with the end 79 of the bar 80 and at its lower end being connected with a rigid loop of the guiding-bar 81, while the upper end of the spring 94 is secured to the said rigid loop of the guiding-bar 81 and the lower end of said spring 94 is secured to the foot 82 of the bar 80. When the bar 80 is moving upward, the spring 94 will contract and the spring 93 will be extended, and when the bar 80 is moving downward the spring 94 will be extended and the spring 93 contracted, the parts being thus put under a slight tension and ease and uniformity of motion being attained. It will be understood, therefore, that the indicating cylinders or drums 63 are rotated to the proper extent by means of the actuating or setting levers 53 while said cylinders or drums 63 are in their lower position (shown in Fig. 8) and that thereafter and during registration the said indicating cylinders or drums 63 are under the action of the crank-handle 76 and driving-shaft 64 moved to their upper position, (shown in Fig. 5,) so that the indication may be exposed through the window-openings 75. The pinion-wheels 72, connected with the indicating cylinders or drums 63, remain in mesh with the teeth 71 of the rack-bars 62, and thus care should be taken in the construction of the machine that during the upward travel of the cylinders or drums 63 they shall only rotate to that definite extent which will insure the predetermined numerals appearing at the window-openings 75. The rotary motion of the cylinders or drums 63 during their upward travel becomes necessary in the present construction, owing to the fact that the rack-bars 62 remain in constant mesh with the pinion-wheels 72 of the said cylinders or drums 63.

The lever-arm 84, hereinbefore described, for engaging the foot 82 of the vertically-movable bar 80 is loosely mounted upon the driving-shaft 64 and has a forwardly-extending short arm 95, which is in position to be pressed downward by the lower edge of the plate 96, secured upon the said driving-shaft 64, the said plate 96, by being carried downward against the short arm 95 of the lever-arm 84, serving to turn the arm 84 upward for the purpose of causing the latter to elevate the vertically-movable bar 80. When the exposed operating crank-handle 76 and driving-shaft 64 are reversed in their motion, as when the said crank-handle 76 is being turned from its horizontal position back to its normal vertical position, it permits the lever-arm 84 to descend to its lower position. The rotation of the driving-shaft 64 by means of the exposed crank or handle 76 to effect registration and cause the plate 96 on the said shaft to contact with the short arm 95 of the lever-arm 94 for the purpose of effecting the elevation of the vertically-movable bar 80 and indicating cylinders or drums 63 having been described, it may be well here to note that adjacent to the plate 96 on the driving-shaft 64 is provided on said shaft the loop or stirrup 97, which contacts with and drives downward the short frontwardly-projecting arm of the locking-bolt 98, which is supported upon the said shaft 64 in near relation to the aforesaid lever-arm 84 and has its lower end in position to at the proper time engage the shoulder 99, formed in the cash-drawer 51, and to thereby lock said drawer in its closed position. When the loop or stirrup 97 on the driving-shaft 64 presses downward on the short arm of the latch-bolt 98, the latter becomes elevated from the shoulder 99 of the cash-drawer 51, and the said cash-drawer will at such time, having become freed, be moved outward to its open position by the action of the coiled spring 52. (Shown in Fig. 3.) Thus the forward and downward rotation of the driving-shaft 64 by means of the exposed crank-handle 76 results not only in the registration being effected, as hereinafter explained, but also in the elevation of the indicating cylinders or drums 63 to their exposure position and the unlocking of the cash-drawer.

Having described hereinbefore that the actuating or setting levers 53 when moved upward operate the indicating cylinders or drums 63 and that thereafter the rotation of the driving-shaft 64 toward the front and downward by means of the exposed crank or handle 76 results in effecting the proper registration, the elevation of the indicating cylinders or drums 63 to their exposure position, and the unlocking of the cash-drawer 51, it will now be appropriate to explain the mechanism by which during said action of the shaft 64 the registration is accomplished. It has been hereinbefore described that upon the shaft 64 is freely mounted a series of segments 61, which under the action of the springs 65 are caused to automatically follow the levers 53 during the upward movement of the latter, the said segments contacting with the edges of the levers 53 during the upward movement of the latter. The upward motion of the levers 53 results in the setting of the segments 61 to the proper predetermined position in accordance with the amount to be registered, and the registration is effected during the return motion of the segments 61 to their lower or initial position, this return motion being effected by the rotation of the shaft 64 on the action of the exposed crank or handle 76.

The registering-wheels are numbered 100 and are freely mounted upon the shaft 101, which is parallel with and substantially directly over the main driving-shaft 64. The shaft 101 is mounted in the front ends of lever-arms 102, which extend forwardly from the rock-shaft 103, the said rock-shaft 103 carrying said arms 102 and the latter carrying the said registering-wheel shaft 101. The shaft 103 is adapted to have a rocking motion, as hereinafter explained, so that at the proper time the registering-wheel shaft 101 may be moved downward for the purpose of carrying the pinion-wheels 104 thereon into engagement with the aforesaid segments 61. The pinion-wheels 104 are each connected with one of the registering-wheels 100 and also with a gear-wheel 105, said wheels being arranged in sets, each set comprising a pinion-wheel 104, a gear-wheel 105, and a registering-wheel 100, the said three wheels of each set being connected together and freely rotatable upon the shaft 101, which has no rotation.

While we do not limit the invention to any special means for connecting the pinion-wheel 104, gear-wheel 105, and registering-wheel 100 together, so that the three wheels may have simultaneous motion on the shaft 101, we illustrate in Fig. 33 one means of thus forming the said wheels into a connected set, it being represented in said Fig. 33 that the wheel 104 is provided with an elongated hub 106, upon which the gear-wheel 105 and registering-wheel 100 are secured, the end of the hub 106 being upset against a washer to lock the wheels upon the hub 106, and said hub 106 being fluted to correspond with the fluted openings through the gear-wheel 105 and registering-wheel 100, so as to key said wheels 105 and 100 upon the hub 106 and prevent their rotation, except with said hub 106 and the pinion-wheel 104. Each of the gear-wheels 105 is minus one tooth, as clearly illustrated in Fig. 13, whereby, as shown in said Fig. 13, the blank space 107 is formed in the periphery of said gear-wheel. Above and somewhat to the rear of the shaft 101 is mounted the shaft 108, upon which is rigidly secured the series of gear-wheels 109, the latter being for engagement with the gear-wheels 105 on the shaft 101 and being utilized for the purpose of returning all of the registering-wheels 100 to their zero position. The gear-wheels 109 are rigid on the shaft 108 and only rotate when the said shaft is operated by means of the exposed handle or knob 110, which, as shown in Figs. 1, 4, and 14, projects outward beyond the side of the register-casing 50. Thus the registering-wheels 100 are rotated to register by the engagement of the segments 61 with the pinions 104 and during the movement of said segments to their downward position, and said registering-wheels 100 may at the proper time be restored to their zero position by the engagement of the gear-wheels 105 with the gear-wheels 109 and during the rotation of said gear-wheels 109 by the manual rotation of the shaft 108 by means of the knob or handle 110. The segments 61 can only act upon the pinion-wheels 104 when the shaft 101 is lowered to bring said pinion-wheels 104 into engagement with said segments 61, and gear-wheels 109 can only be utilized in connection with the gear-wheels 105 to restore the registering-wheels 100 to their zero position when the shaft 101 is in its upper position, (shown in Fig. 24,) in which position the gear-wheels 105 and 109 intermesh with one another. When the gear-wheels 105 are in their upper position, it will be seen that the rotation of the gear-wheels 109 will result in the turning of all of the registering-wheels 100 until the blank spaces 107 of the gear-wheels 105 come into alinement with the gear-wheels 109 and that at such time the continued motion of the gear-wheels 109 will have no influence upon the gear-wheels 105 or the registering-wheels 100 connected therewith. In view of the fact that each of the gear-wheels 105 is possessed of the blank space 107 the said gear-wheels may come to a rest one after another as the registering-wheels 100 reach their zero position. The blank spaces 107 in the gear-wheels 105 are so disposed with respect to the registering-wheels 100 that the registering-wheels 100 will cease to rotate during the setting-back operation, when the ciphers thereon appear directly below the openings 111 in the transverse bar or frame 112, extending transversely above the registering-wheels 100 to conceal the numerals on said registering-wheels, with the exception of the special line of numerals, which may be directly below the aforesaid openings 111 in said frame 112, said openings 111 constituting spy holes or slots through which the owner of the register at the proper time may "read" the registering-wheels and totalizing-wheels.

Since we have been referring in the description of the gear-wheels to the setting back of the registering-wheels to their zero position and the reading of the said registering-wheels by the owner of the register, it may be well here to call attention to the fact that in order to read the registering-wheels 100 the hinged door 212, provided in the front of the register-casing, must be unlocked and opened, and it is our purpose that the owner of the register shall alone possess the key by which the lock securing the door 212 may be operated. When the door 212 is opened to its inward position, the owner of the register may inspect the registering-wheels by looking through the openings 111 in the frame 112. After "reading" the registering-wheels the owner of the register should return the registering-wheels 100 to their zero position, and this he will do by the rotation of the shaft 108 and pinion-wheels 109 in the manner hereinbefore described. The shaft 108 and pinion-wheels 109 can only be rotated when the door 212 is in its open position, since said door is provided with an arm 113, which when the door 212 is in its closed position contacts with the front end of the dog 114, Fig. 5, and holds its detent down against one of the wheels 109, whereby the wheels 109 and their shaft 108 are locked in stationary position. Thus when the door 212 is opened the owner of the register may inspect the registering-wheels and make a memorandum of the amount registered up to that time, and thereupon, the door 212 then being free of the dog 114, he may by operating the shaft 108 and pinions 109 restore the registering-wheels 100 to their zero position. The dog 114 has connected with it a light spring 115, so as to retain the proper relation of said dog to its pinion-wheel 109; but when the arm 113, connected with the door 112, moves inward free of the dog 114 the pinion-wheel 109 may rotate with the shaft 108, notwithstanding the spring 115, since the sides of the said detent are beveled and will permit the teeth of the pinion-wheel 109 to slide over it. The pinion-wheel 109, which is engaged by the dog 114, corresponds with all of the other pinion-wheels 109, but is located close against the left-hand side frame 78, and it is to this left-hand side frame 78 that the dog 114 is pivotally secured.

We have described hereinbefore that during the upward motion of the actuating or setting levers 53 the segments 61 follow said levers under the force of the springs 65, connected with the rearwardly-extending arms 66 on said segments. When the actuating or setting levers 53 are moved upward to set or permit the setting of the segments 61, the shaft 101, carrying the pinion-wheels 104 and registering-wheels 100, is in its upper position, (shown in Fig. 24,) and the next step in the operation of the machine necessary to be performed will be the lowering of said shaft 101, so that its pinion-wheels 104 may pass into mesh with the said segments 61, as indicated in Fig. 5. The mechanism for thus lowering the shaft 101 is probably more clearly illustrated in Figs. 24, 28, and 29, and this mechanism is initially set in motion by the operator in pulling the exposed crank or handle 76 from its vertical position (shown in Figs. 4 and 28) to its lower or horizontal position. (Indicated by dotted lines in Fig. 2 and by full lines in Fig. 3.) Upon the end of the rock-shaft 103 carrying the arms 102 102, which support at their front ends the registering-wheel shaft 101, is provided the arm 116, which is normally under the tension of a spring 117, which tends to pull downward on the said arm 116, and thereby to turn the shaft 103 to move the registering-wheel shaft 101 to its upward position. (Shown in Fig. 24.) The arm 116 carries an adjustable stop-screw 118, whose lower end bears upon the upper rear edge of a plate 119, which is loosely hung upon the said rock-shaft 103 and which is normally kept against the stop-screw 118 by means of the cam 120, secured upon the driving-shaft 64 and having its edge in direct contact with a roller 121, secured to the said plate 119, as shown in Fig. 24. The spring 117, acting upon the arm 116, presses downward against the plate 119, and the cam 120, contacting with the roller 121, keeps said plate 119 from passing unduly downward and in addition acts upon said plate 119 when the shaft 64 is rotated, in the manner hereinafter explained. Upon the shaft 103, adjacent to the said plate 119, is also loosely mounted the plate 122, having at its lower corner the notch to receive the engaging end of the pivoted dog 123, which is on the shaft of the roller 121, and is therefore carried by the plate 119. The plate 119 carries the bell-hammer lever 124, and the plate 122 carries a pin 125, which at the proper time contacts with the short arm of the bell-hammer lever 124 and causes the sounding of the gong 126 in a well-known manner. In Fig. 24 the parts there illustrated are shown in the normal position they occupy when the exposed crank-handle 76 is in its normal upright position. When the exposed crank or handle 76 is pulled frontward toward its horizontal position, the cam-plate 120 on the driving-shaft 64 moves against the roller 121 and causes the roller and plate 119 to move rearward, and the moving rearward of the plate 119 operates through the dog 123 to move the plate 122 upward and rearward, and in addition the rearward motion of the plate 119 acts against the arm 116, fastened to the rock-shaft 103, to turn said rock-shaft, and thereby cause the registering-wheel shaft 101 to descend to its lower position, carrying the pinion-wheels 104 for the registering-wheels 100 into mesh with the then "set" segments 61. The continued downward motion toward the front of the exposed crank-handle 76, rotating the driving-shaft 64, results, in the manner hereinafter described, in the segments 61 being restored to their zero position and the rotation thereby of the pinion-wheels 104 and registering-wheels 100, and in addition the said downward motion of the crank-handle 76 to its horizontal position causes the maintenance of the registering-wheel shaft 101 in its down position during all of the time that the periphery of the cam 120 is moving against the roller 121, carried by the plate 119. When the crank-handle 76 reaches its lower position, the pin 127, carried by the cam 120, will contact with the shank end of the dog 123 and turn the rear engaging end of said dog downward from the notched plate 122, and at this time the plate 119 will still remain in its rear position; but the plate 122 will be quickly pulled downward by means of the spring 128, (shown in Figs. 28 and 29,) the downward movement of said plate 122 being to cause the pin 125 to quickly contact with the short arm of the bell-hammer lever 124 and sound the gong 126, this happening when the crank-handle 76 reaches its lower position, the registration having then been effected. The spring 128 is enabled to pull down the plate 122 when the dog 123 is tripped by means of the pin 127, since said spring 128 is connected with the stop-plate 129, (see Figs. 28 and 29,) whose upper end is connected with the stud 130, secured at its inner end to said plate 122. The plate 122 can only descend until the stop-plate 129, then in its upper position, (having been pulled up by the rearward motion of the plate 122,) reaches the shaft 131, to which the lower end of the spring 128 is connected and which serves to arrest the stop-plate 129 when the latter reaches its lower position. During the return of the exposed crank-handle 76 to its upper position the pin 127 on the cam 120 will leave the pivoted dog 123 and the periphery of said cam 120 will ride against the roller 121 until the recessed rear end of said cam 120 reaches said roller, whereupon the roller 121 under the influence of the spring 117 will follow into the recessed portion of the cam 120, and the pin 132 will strike the upper surface of the shank end of the dog 123 and turning the same downward will cause the rear engaging end of said dog to again enter the notch in the plate 122, the parts being then restored to their normal position in which they are shown in Fig. 24 and the exposed crank-handle 76 then having reached its upper normal position. The pivoted dog 123 has on its inner side a forked spring 133, as indicated by dotted lines in Fig. 24, which bears with its two ends against the pivot for the dog 123 and creates sufficient friction to maintain the said dog 123 in the positions which may be given to it when the pin 127 strikes the shank end of said dog and turns the rear engaging end of the latter from the notched plate 122. The spring 133 is simply a friction-spring and prevents the dog 123 from passing into such position that it might not possibly be reached by the pin 132 when the latter is to restore said dog to its normal position. (Shown in Fig. 24.) The stud 130, connected with the plate 122 and upon which the stop-plate 129 is hung, connects said plate 122 with the pawl-plate 134, loosely mounted upon the outer end of the rock-shaft 103, as shown in Figs. 28 and 29, and this pawl-plate 134 has at its upper and lower ends the pawls numbered 135 and 136, respectively, to engage the ratchet-plate 137, the purpose of said ratchet-plate 137 being to compel the operator to give the exposed crank-handle 76 a full downward motion before said crank-handle can be moved upward to its normal position and to give said crank-handle 76 a full upward motion after the same has been started upward before it can be again moved downward. The ratchet-plate 137, pawl-plate 134, pawls 135 and 136, stop-plate 129, and spring 128, all shown in Figs. 28 and 29, are not separately claimed in this application, since the said features are shown, described, and claimed in Letters Patent No. 640,825, granted January 9, 1900, to Ideal Cash Register Company, as assignee of Elijah F. Spaulding, and since the said features are fully described and claimed in the said Letters Patent it is unnecessary to further describe the same in this specification. The pawl-plate 134 in this application has connected with it one feature which is not shown in the said Patent No. 640,825, and said feature is the locking-plate 138, which in the present application is utilized to coact with the groove 139, Fig. 30, in the hub 140 of the crank-handle 76 to prevent the removal of said crank-handle from the driving-shaft 64 except when said crank-handle 76 is pulled forward slightly, so that the cam 120, acting through the plate 119 and dog 123, turns the plate 122, and with it the lower portion of the pawl-plate 134, rearward to a sufficient extent for said pawl-plate 134 to carry the locking-plate 138 from the said groove 139 in the hub 140 of the crank 76, as shown in Fig. 29. When the crank 76 is in its upper position and the plates 119, 122, and 134 are in their lower or normal position, the front end of the locking-plate 138 will lie within the groove 139 of the hub 140, and the said locking-plate will then prevent the removal of the crank 76 from the shaft 64, and the purpose of thus locking the crank 76 within the register-casing is to prevent the removal of the said crank 76 and the wrongful operation of the driving-shaft 64 by means of an instrument inserted through the hole in the side of the register-casing through which the hub 140 of the said crank 76 passes. It is necessary, however, to so secure the crank 76 that at the proper times the register-casing 50 may be elevated or removed, and hence we apply the locking-plate 138 upon the movable pawl-plate 134, so that when the crank-handle 76 is pulled slightly forward the pawl-plate 134 will withdraw the locking-plate 138 from the said crank and permit of the removal of the latter. The crank-handle 76 is prevented from being pulled forward, so as to relieve the locking-plate 138 from it, (except when such result is desired,) by means of a latch-rod 141, Figs. 30 and 31, secured in the handle proper, 142, at the upper end of said crank 76, the said latch-rod 141 being adapted when pressed inward to be caught at its inner end by the spring-bolt 143, secured to the side frame, which supports the interior mechanism of the register. The pushing inward of the latch-rod 141 causes the inner beveled end of said rod to press inward the bolt 143 until the said head passes said bolt, and thereupon the said bolt 143 will spring outward into the recess 144 at the inner end of said rod 141, as shown in Fig. 30. Fig. 30 shows the latch-rod 141 as secured at its inward position by the bolt 143, and when in such position the said latch-rod 141 will prevent the crank 76 from being operated, and consequently will prevent the said crank 76 from being pulled to any position in which the locking-plate 138 will be relieved from the annular groove 139 in the hub of said crank 76. The latch-rod 141 will only be released to spring outward to the position in which it is shown in Fig. 31 by the application of the proper key to the key-hub 145 for the withdrawal of the bolt 143 from the recess 144 of the said latch-rod. The locking-plate 138 thus secures the crank 76 against removal from the end of the driving-shaft 64, and the latch-rod 141, in connection with the locking-bolt 143, secures the upper end of said crank against movement. This application is not limited to any special character of lock for securing the upper end of the crank 76 against movement; but we have used with entire satisfaction and success the latch-rod 141 and locking-bolt 143 for this purpose.

The mechanism for normally holding the registering-wheel shaft 101 in its elevated position and the means for lowering the said shaft 101, so as to carry its pinion-wheels 104 into engagement with the then-elevated segments 61, having been described, we will now describe the means connected with the main driving-shaft 64 by which during the downward and forward motion of the exposed crank or handle 76 the segments 61 receive their downward and forward motion to their initial normal position, said segments 61 during such downward and forward motion to their initial position operating to rotate the pinion-wheels 104 and the registering-wheels 100, connected therewith. The main driving-shaft 64 is furnished with the series of pins 150, Figs. 4, 6, and 7, in alinement with one another, and also with the series of pins 151, which are in alinement with one another, the pins 151 being utilized in connection with the carrying mechanism hereinafter described and the pins 150 being provided for carrying and to engage the pins 68, carried by the segments 61. After the segments 61 have followed up the hand setting-levers 53 to their desired position and the registering-wheels 100 have been lowered by the forward motion of the exposed crank or handle 76 the continued motion of the crank or handle 76 to its lower horizontal position causes the shaft 64 to turn the pins 150 against the pin 68, carried by the segments 61, and by pressing on said pins 68 to return the segments 61 to their normal downward position, said segments 61 during this movement operating through the pinions 104 to rotate the registering-wheels 100. The pins 150 constitute the element connected with the driving-shaft 64 by which during the turning of said shaft toward the front and downward the segments 61 are restored to their normal downward position. The shaft 64 after the segments 61 reach their normal downward position is returned to its normal position by the upward movement of the crank-handle 76 to its normal upright position, and during the return motion of the shaft 64 to its normal position the pins 150 leave the pins 68 of the segments 61, and said segments remain in the position given to them by the said pins 150 until during the latter part of the upward motion of the crank-handle 76 the pinion-wheels 104 are by the elevation of the registering-wheel shaft 101 elevated from contact with said segments 61. Upon this release of the pinion-wheels 104 from the segments 61 so many of the latter as may be in contact with the hand setting-levers 53 then at their lower or zero position will remain in their lower position under the restraint of said levers, and so many of said segments as may have been moved downward from the setting-levers 53 then in an elevated condition will, having been released from the pinion-wheels 104, turn upward under the influence of the springs 65 to a position in contact with the then-elevated levers 53, which is the position from which they were carried by the contact with them of the said pins 150.

The segments 61 on their forward and downward motion rotate the registering-wheels 100 a predetermined distance, governed by the position of the setting-levers 53, and said segments 61 when arriving at their downward position should meet with stops, so as to insure of their being arrested when they have completed the due extent of movement, and to this end we provide below the setting-levers 53 and in front of and slightly below the driving-shaft 64 the rock-shaft 152, to which are rigidly secured four stop-arms 153, one being disposed below each segment 61 and in position to arrest said segments when the latter arrive at their lower position. The stop-arms 153 are in line with one another on the shaft 152 and turn with said shaft. At its right-hand end the shaft 152 has secured upon it the arm 154, whose normal position is that shown in Fig. 24, in which position the said arm 154 rests against the hub of the cam 120, secured upon the right-hand portion of the main driving-shaft 64, being there held under the tension of the spring 155. The arm 154 is rigidly secured on the shaft 152, and hence the position of the arm 154 will govern the position of the stop-arms 153. When the crank-handle 76 is in its upper position, the cam 120 will be in the position in which it is illustrated in Fig. 24, and at this time the arm 154 on the stop-shaft 152 will rest against the hub of the cam 120 and the stop-arms 153 will be in their lowermost position. When the operating crank or handle 76 is pulled frontward and downward to actuate the segments 61 and return them to their normal or zero position, the cam 120 will move upward toward the rear and the pin 132, carried thereby, will move frontward and contact with the arm 154 on the shaft 152, with the result that the arm 154 will be turned upward toward the front a slight distance, or far enough to rock the shaft 152, and thereby carry the stop-arms 153 from the position in which they are shown in Fig. 24 to a slightly-elevated position and a distance upward equal to about the width of one tooth of the segments 61, so that at such time when the crank-handle 76 is pulled to its down position the stop-arms 53 will then be in a slightly-elevated position—that is, in a position to arrest the segments 61 when they arrive at their downward position. (Shown in Figs. 8 and 24.) In Figs. 8 and 24 the stop-arms 153 are shown as being slightly below the segments 61, and this is the correct position of said stop-arms 153 when the crank-handle 76 is in its upper normal position; but when said crank-handle is pulled downward to a horizontal position the pin 132, Fig. 24, will by moving against the lever-arm 154 rock the shaft 152 and elevate the stop-arms 153, so that the latter may arrest the segments 61 when said segments reach their lower position, and the pin 132 will maintain the stop-arms 153 in their slightly-elevated position during all of the time that the crank-handle 76 is in its lower position and until, on the return of said crank-handle to its upper position, said pin 132 is carried rearward from the lever-arm 154, and at that time the spring 155 will act to turn the rock-shaft 152, moving the lever-arm 154 against the hub of the cam 120 and causing the stop-arms 153 to descend to their lower position. (Shown in Figs. 8 and 24.) The stop-arms 153 thus ascend to meet the segments 61 and arrest them when they reach their lower normal position, and said stop-arms 153 then descend, when the crank-handle 76 is returned to its vertical position, and the purpose of thus causing the stop-arms 153 to descend during the upward or return motion of the exposed crank-handle 76 is to permit of any one or more of the segments 61 to have a further downward motion equal to the space of one of their teeth, for the purpose of carrying from one registering-wheel to another whenever the carrying is to be done. If the stop-arms 153 did not descend during the return upward motion of the exposed crank-handle 76, the segments 61 would always have a uniform throw; but in view of the fact that the stop-arms 153 do descend during the up motion of the exposed crank-handle 76 the segments 61 may, should the carrying be necessary, have a further downward motion by the means hereinafter described to permit the carrying from one registering-wheel to another.

The carrying mechanism will now be described. Connected with the pinion-wheels 104 for rotating the registering-wheels are secured the disks 156, one of which is shown in detail in Fig. 23 having the fingers or arms 157, which upon the full rotation of one wheel—as, for example, the units-of-cents wheel—will set in motion or in condition for operation certain intermediate mechanism by which one may be carried to the next adjacent wheel in series—as, for instance, from the units-of-cents registering-wheel to the tens-of-cents registering-wheel. The disks 156, having the arms or fingers 157, rotate with the pinion-wheels 104 and registering-wheels 100. In rear of the registering-wheel shaft 101 is mounted a shaft 158, upon which is placed the series of sleeves 159, which correspond with one another except as to the length of the same. The sleeves 159 are adapted at the proper time to have a limited turning action on the shaft 158, and said shaft 158 is stationary. One sleeve 159 extends from a position about in line with the units-of-cents registering-wheel to the tens-of-cents registering-wheel, and is therefore a short sleeve. The next adjoining sleeve 159 extends from a position about in line with the tens-of-cents registering-wheel to the units-of-dollars registering-wheel, and is therefore a long sleeve, and the next adjoining sleeve (there being three of the sleeves employed) extends from the units-of-dollars registering-wheel to the tens-of-dollars registering-wheel, all of said sleeves being on the said shaft 158 and being in position to be contacted with and moved in one direction by the fingers 157 on the disks 156 when the registering-wheels make a complete rotation. The purpose of the fingers 157 on the disks 156, on passing the sleeves 159 at each rotation of a register-wheel, is to turn the sleeve 159 to a limited extent in one direction. The sleeves 159 coöperate with the levers 160 and 161, respectively, said levers 160 161 being arranged in pairs and all hung upon the rock-shaft 103, though not operated nor influenced by said rock-shaft, the latter merely affording a convenient support for the rear hooked ends 162 and 163, respectively, of said levers 160 and 161. The levers 160, hung upon the rock-shaft 103, carry upon their front ends the pivoted pawls 164, (see Figs. 8, 9, 10, 35, and 36,) whose upper engaging ends are held against the pinion-wheels 104 by means of small coiled springs 165, the latter being shown in Figs. 8, 35, and 36. The lower rear end of the lever-arms 160 are connected with coiled springs 166, which pull downward on the front ends of said levers 160 and when unopposed cause the pawls 164 to move downward on the pinion-wheels 104 a distance equal to one tooth of said wheels, the object being at the proper time to cause the pawls 164 to give the pinion-wheels 104 and their connected registering-wheels 100 a rotation equal to the extent of one tooth when the carrying is to be done.

The upper rear portion of the lever-arms 160 are in close relation to the shaft 158 and sleeves 159 thereon, as shown in Fig. 8, and said portions of said levers 160 are formed with the shoulder 167 and recess 168, said shoulder 167 being adapted to receive one edge of the semicircular shoulder 169 of the sleeve 159, and said recesses 168 being adapted to encompass a part of the rear side of the shaft 158 at the side of the end of the sleeve 159 where the sleeve 159 is cut away to form the shoulder 169, said shoulder 169 extending only half-way around the sleeve 159. The shoulder 169 is in every case at the left-hand end of the sleeve 159, and the levers 160, which are engaged by the said shoulders 169 of the sleeves 159, are three in number, one being adjacent to the left-hand end of each of the three sleeves 159 and maintaining their pawls 164 in engagement with the pinion-wheels 104 for the tens-of-cents, units-of-dollars, and tens-of-dollars registering-wheels. The shoulder 169 when in normal engagement with the shoulders 167 of the levers 160 prevent the springs 166, connected with said levers, from moving the pawls 164 downward on the pinion-wheels 104, which is only done preparatory to carrying, and it is only during the complete rotation of a registering-wheel that the shoulders 169 of the sleeves 159 are moved from their normal relation to the shoulders 167 of the levers 160, so as to permit the latter to have a slight pivotal action under the influence of the spring 166 to effect the downward movement of the pawls 164 over the pinion-wheels 104 a space equal to the width of one tooth of said pinion-wheels. The means for giving at the proper time the sleeves 159 a partial rotation to relieve the shoulders 164 from the shoulders 167 of the levers 160 are the disks 156, connected with the pinion-wheels 104 and having the fingers 157 of proper length to reach and act upon the said sleeves 159, the fingers 157 when making a rotation contacting with said sleeves 159 and causing the same to be turned downward and rearward a slight distance around the shaft 158, thereby causing the upper end of the shoulders 169 on said sleeves to pass frontward from beneath the shoulders 167 on said levers 160 and permitting the springs 166 to turn said levers 160 toward the driving-shaft 64, as shown in Fig. 36. When the upper end of the shoulder 169 of the sleeves 159 is below the shoulder 167 of the levers 160, the latter are held in their normal position, Fig. 35, against the stress of the springs 166; but when during the turning of the sleeves 159 the upper end of the shoulder 169 of said sleeves is turned frontward from below the shoulder 167 of the levers 160, the front ends of said levers 160 may turn downward until the front edge of the said shoulder 167 of said levers 160 contacts with the upper rear edges of said shoulder 169, as shown in Fig. 36, which then acts as a stop to prevent any further downward movement of the front ends of said levers 160. The purpose of the shoulder 169 on the sleeves 159 is normally to prevent the levers 160 and their pawls 164 from having any influence on the pinion-wheels 104, connected with the registering-wheels, and also upon the necessity arising for the carrying from one registering-wheel to another to permit the levers 160, under the influence of the springs 166, to move downward just enough to allow the pawls 164 to pass downward over one tooth of the pinion-wheels 104, so that on the following upward motion of the crank-handle 76 the pins 150 on the shaft 64 may upon moving against and elevating the levers 160 cause the pawls 164 to ascend to their normal position with relation to said wheels 104 and in doing so rotate said wheels 104 and the registering-wheels connected therewith a distance equal to one space, thereby effecting the carrying. When the upper end of the shoulder 169 of the sleeves 159 is turned outward from the shoulder 167 of the levers 160, the space then left between the rear end of said shoulder 169 and the adjacent edge of the shoulder 167 on the lever 160 will be very slight and just enough to enable the front end of the levers 160 to move the pawls 164 downward the proper distance to rotate the pinion-wheels 104 (on the following upward movement of the handle 76) a distance equal to the space of one tooth. It has been mentioned before that the fingers 157 of the disks 156, connected with the pinion-wheels 104, impart the partial rotation to the sleeves 159, which results in the turning outward of the upper end of the shoulders 169 of said sleeves from the shoulders 167 of the levers 160, and the contact of the fingers 157 with the sleeves 159 takes place at the right-hand end of said sleeves 159, where there is provided a shoulder 170 to receive the contact of the said fingers 157 during the downward travel of said fingers. When the disks 156 make their rotation with the pinion-wheels 104, the fingers 157 of said disks turn downward against the shoulder 170 at the right-hand end of the sleeves 159 and cause said sleeves to have the partial rotation which turns the upper ends of the shoulders 169 thereof from under the shoulders 167 of the levers 160. After the fingers 157 turn the sleeves 159 the said fingers 157 will pass from the shoulders 170 of said sleeves 159 and leave said sleeves in their then position, having turned said sleeves from their normal position. For the purpose of restoring said sleeves 159 to their normal position after they have been turned by the contact of the fingers 157 with the shoulders 170 thereof we provide the aforesaid levers 161, there being three of the levers 161, and one of said levers being adjacent to the right-hand end of each of the sleeves 159. The levers 161 each have an upwardly-extending arm 171, Figs. 44 and 45, which arms 171 are disposed directly below the lower side of the shoulders 170 of the sleeves 159, and the purpose of the said arms 171 is when the levers 161 are pressed upward to contact with the lower surfaces of the said shoulders 170, and thereby effect the restoration of the sleeves 159 to their normal position. The levers 161 have connected with their rear ends the springs 172, which, like the springs 166, connected with the levers 160, pull downward on the levers 161 and cause the front portions of said levers to descend downward toward the main driving-shaft 64. The normal position of the front ends of the said levers 161, when the main crank-handle 76 is its normal vertical position, is on the upper ends of the pins 151, hereinbefore described as being connected with the main driving-shaft 64. When the crank-handle 76 is pulled frontward and the pins 151 pass from below the front ends of levers 161, the springs 172 then pull the front ends of said levers 161 downward against the driving-shaft 64, and when the operating crank-handle 76 is pushed upward to its normal position, and thereby turns the shaft 64 toward the rear, the pins 151 pass under the ends of the levers 161 and elevate the latter, so as to carry the arms 171 of said levers 161 against any of the shoulders 170 of the sleeves 159 which might have been turned downward by the fingers 157 of the disks 156. With each downward motion of the crank-handle 76 the levers 161, under the influence of the springs 172, turn downward to permit of the partial rotation of the sleeves 159, and during each upward motion of the exposed crank-handle 76 the said levers 161 move upward with their arms 171, so that the latter may restore to their normal position any of the sleeves 159 which may have been turned downward during the downward motion of the said crank-handle 76.

The actual carrying from one registering-wheel to another is done during the upward motion of the crank-handle 76 from its lower horizontal position to its vertical or normal position, and, as hereinbefore described, the stop-arms 153 on the shaft 152 move downward a slight distance equal to one tooth of the segments 61, when the crank-handle 76 starts upward, leaving the segments an opportunity of traveling one further tooth downward if necessary. If, therefore, during the downward motion of the exposed crank-handle 76 any of the disks 156 shall have made a revolution and move the sleeves 159, so as to carry the upper ends of the shoulders 169 of said sleeves from below the shoulders 167 of the levers 160, the said levers 160 under the influence of the springs 166 will be enabled to move their pawls 164 downward preparatory to rotating the pinion-wheels 104 a distance equal to one tooth during the upward motion of the exposed crank-handle 76 and as soon as the stop-arms 153 have moved to their lower position. (Shown in Fig. 8.) During the downward travel of the crank-handle 76 the levers 160 will not effect the carrying, because at that time the pinion-wheels 104 are in positive engagement with the segments 61, and the latter are in positive engagement with the pins 150 on the driving-shaft 64 and are moved against the then fixed stops 153, the latter being then in their elevated position, prohibiting the segments 61 from moving below their normal downward or zero position; but when the exposed crank-handle 76 moves upward and the stop-arms 153 turn downward the pins 150 recede from the segments 61 and pass into engagement with and elevate any of the levers 160 which may have been released to descend, and thereby cause the pawls 164 of such levers 160 to turn the pinion-wheels 104 and the registering-wheels connected therewith, thus effecting the carrying from one registering-wheel to another. During the rotation of the pinion-wheels 104 by the pawls 164 the said pinion-wheels turn the segments 61 one tooth farther downward, this being permitted from the fact that the stop-arms 153 have moved downward a space equal to one tooth. The disk 156, connected with the units-of-cents registering-wheel 100, will turn the first sleeve 159 to carry the upper end of its shoulder 169 from the shoulder 167 of the first lever 160 to the right, and the pawl of this first right-hand lever 160 engages the pinion-wheel 104, connected with the tens-of-cents registering-wheel 100, and by reason of such relation of parts the lever 160 is permitted to carry one from the units-of-cents registering-wheel to the tens-of-cents registering-wheel every time the units-of-cents registering-wheel makes one rotation. The carrying from the tens-of-cents registering-wheel to the units-of-dollars registering-wheel is performed in exactly the same manner as the carrying is done from the units-of-cents to the tens-of-cents registering-wheels. The carrying from the units-of-dollars to the tens-of-dollars registering-wheels is performed in exactly the same manner as the carrying is done from the units-of-cents to the tens-of-cents registering-wheels, the carrying mechanism being simply duplicated along the series of wheels. The several levers 160, whose motion finally effects the carrying from one registering-wheel to another, vary in their length, so that the said levers may one after another operate the pinion-wheels 104, with which they may be connected, so that the carrying will be done from one wheel to another in series, and in Figs. 46, 47, and 48 we illustrate this feature of the structure, the levers 160 being exactly alike in all said figures, with the exception that the lower front ends of the levers are shorter in length in series—that is to say, that the front end of the lever 160 for the tens-of-cents registering-wheel, Fig. 46, is extended farther downward than the like portion of the dollars-lever 160, Fig. 47, and that the said portion of the said dollars-lever 160 is extended farther downward than the like portion of the tens-of-dollars lever 160, Fig. 48, the purpose of thus shortening off or graduating the front ends of the levers 160 being to compel the pins 150, which are in a straight line, to act on said levers 160 one after another in series, or, in other words, to prevent the pins 150 from reaching and acting on said levers 160 except on one after another in series.

The totalizing-wheels are numbered 173 and 174 and are, as usual, on the registering-wheel shaft 101. The totalizing-wheels are connected with pinion-wheels 175 to accomplish their rotation, and below the said pinion-wheels 175 are mounted for coöperation therewith the plates 176, (see Figs. 4, 15, 16, 21, and 22,) said plates 176 being seated upon the driving-shaft 64 and having upwardly-extending arms 177 and 178, encompassing the lower portion of the said pinion-wheels 175. Between the arms 177 and 178 of the plates 176 the latter are provided with two teeth 179, which engage the teeth of the said pinion-wheels 175. The plates 176 are under a normal tension drawing them rearward by means of the coiled springs 180, Figs. 15 and 16, and the arms 177 of said plates 176 are provided with the laterally-extending lips 181, which are in a position to be contacted with by the fingers 157 of the disks 156, respectively connected with the pinion-wheel 104 for the tens-of-dollars registering-wheel 100 and with the totalizing-wheel 173. When the disks 156, connected with the pinion-wheel 104 for the tens-of-dollars registering-wheel 100, makes a complete revolution, it will contact with the lip 181 of the plate 176 for the first totalizing-wheel 173, and in doing so will cause said plate 176 to have a limited turning motion on the driving-shaft 64 against the stress of the spring 180, and this will occur when the registering-wheel shaft 101 is in its lower position and has carried the pinion-wheels 175 into mesh with the teeth 179 at the upper ends of the plates 176, and therefore when the disks 156 do make the complete rotations and turn the plates 176 the teeth 179 of said plates then in engagement with the pinion-wheels 175 will effect the step-by-step rotation of the totalizing-wheels. When the disks 156 turn the plates 176 against the stress of the springs 180, the said plates 176 are compelled to remain in their then position, so that they may not reverse the motion of the totalizing-wheels, by means of spring pawl-arms 182, (see Figs. 15 and 16,) which engage the pinion-wheels 175 at their upper surfaces and dog said wheels against reverse motion. When the exposed crank-handle 76 is returned to its upper vertical position, the pinion-wheels 175, being carried by the shaft 101, will leave their engagement with the teeth 179 of the plates 176, and thereupon the springs 180 may return the plates 176 to their normal or rear position. The arms 177 of the plates 176 when the latter are turned rearward by the springs 180 will rest against the front portions of the pinion-wheels 175 and act as stops to prevent the said plates 176 from being turned unduly rearward. When the plates 176 are moved frontward, as during the carrying, the arms 178 of such plates 176 will prevent such plates 176 from moving unduly frontward. The disk 156, having the arm 157 connected with the pinion-wheels 104, serves at the proper time to move the plate 176, which actuates the totalizing-wheel 173, and the disk 156, connected with the totalizing-wheel 173, acts upon the plate 176 for the totalizing-wheel 174, and thus the carrying is done from the tens-of-dollars registering-wheel to the totalizing-wheel 173 and from the totalizing-wheel 173 to the totalizing-wheel 174.

In order to prevent reverse motion of the totalizing-wheels, we employ the spring-pressed dogs 182, (shown in Figs. 15 and 16,) and in order to control the units-of-cents registering-wheel we employ a similar dog 183, as shown in Fig. 5; but for the purpose of preventing reverse motion of the other registering-wheels we provide on the registering-wheel shaft 101 the coiled spring 184, which is compressed between sleeves 185, capable of limited sliding action on the said shaft 101, as indicated in Figs. 4 and 32. The ends of the sleeves 185 press outward against the pinion-wheels 104 of the tens-of-cents and units-of-dollars registering-wheels 100, and the hubs 106 of the pinion-wheels 104 for the tens-of-cents and units-of-dollars registering-wheels contact with the ends of the sleeves for the units-of-cents and tens-of-dollars registering-wheels as stops, whereby the spring 184 is enabled by its outward pressure to create sufficient friction at the ends of the sleeves 106 of the pinion-wheels 104 to prevent reverse motion of said pinion-wheels during the upward travel of the exposed operating crank-handle 76.

The actuating or setting levers 53 are locked against movement except when the crank-handle 76 is in its upper normal position, or, in other words, means are provided for locking the said levers 53 during all of the time that the exposed crank-handle 76 is moving from its upper position to its lower horizontal position and then back to its upper position, and the means for locking the said levers 53 against motion may be seen in Figs. 3, 4, 8, 25, and 28, and being substantially the same as the means for accomplishing the like purpose shown, described, and claimed in Letters Patent of the United States numbered 640,825, issued to the Ideal Cash Register Company on January 9, 1900, as assignee of Elijah F. Spaulding, the said means will not require elaborate explanation here.

The means for locking the setting-levers 53 against movement comprise the series of segmental racks 186, one being secured to each of said levers 53, the sliding bar 187 having the lips 188, Figs. 3 and 8, at its upper edges to engage the teeth of said racks 186, a spring 189 to normally maintain said lips 188 withdrawn from said racks 186, (Figs. 4 and 14 show the spring 189,) and the plate 190, Fig. 28, on the right-hand end portion of the main driving-shaft 64, adapted to engage the inclined end 191 of said plate 187 when the crank-handle 76 is pulled downward. The spring 189 serves to draw the plate 187 toward the right to keep the lips 188 out of contact with the racks 186, connected with the setting-levers 53, and the plate 190 on the driving-shaft 64 operates as soon as the crank-handle 76 is started frontward and downward to move the plate 187 toward the left in opposition to the force of the spring 189, and thereby cause the lips 188 to engage the racks 186 and lock the levers 153 in stationary position. The plate 190 is of sufficient extent to maintain the sliding plate 187 at its position to the left during all of the movement of said crank-handle 76 from its upper position to its lower position and then back to its upper position.

After the machine has been operated any special length of time, as at the close of each day, the owner of the register may desire to read the wheels, and if so this may be done by opening the door 212 and inspecting the wheels through the reading-apertures 111 in the transverse plate or frame 112, hereinbefore described. After the reading of the registering-wheels the owner of the register, should he desire to return all said wheels to their zero position, will do so upon the rotation of the shaft 108 and gear-wheel 109 by means of the exposed knob or handle 110 in the manner hereinbefore described. In order to facilitate the operation of returning all of the registering-wheels to their zero position and to enable the operator to do so and without performing any intermediate operations prior to the rotation of the setting-back shaft 108 by means of the knob 110, we provide within the register the rock-shaft 192, (shown in detail in Fig. 14ᵃ,) which has at its rear side the three depending dog-arms 193 and at its front side the depending lever-arm 194, the latter resting upon the plate 96 at about the center of the driving-shaft 64. The movement of the driving-shaft 64, carrying the plate 96 forward from under and then upward against the lower end of the lever-arm 194, serves to impart a rocking motion to the shaft 192, whereby the dog-arms 193 are either moved forward or rearward. When the crank-handle 76 is pulled to its lower position, the plate 96 on the driving-shaft 64 will pass forward from under the lower end of the lever-arm 194 and allow said lever-arm to turn downward slightly, and at such time the rocking motion given to the shaft 192 will turn the dog-arms 193 rearward, and when the crank-handle 76 is moved to its upper vertical position the plate 96, pressing against the lower end of the lever-arm 194, will rock the shaft 192 in a reverse direction and move the dog-arms 193 toward the front. The dog-arms 193 when moved toward the front are there maintained by the contact of the plate 96 with the lever-arm 194, and said lever-arms 193 will have reached their front position when the crank-handle 76 is in its normal vertical position. The dog-arms 193 when at their front position, with the operating crank-handle 76 in its vertical position, contact with the rear edges of the three levers 160 and prevent the springs 166 from moving said levers 160. The levers 160 being thus held in restraint cannot have any effect through their pawls 164 on the pinion-wheels connected with the registering-wheels, and thus during the rotation of the registering-wheels while setting them back to their zero position the levers 160 cannot do any carrying from one registering-wheel to another, even though at such time the disks 156, connected with the registering-wheels, may make a complete rotation and act upon the sleeves 159 on the shaft 158. In the absence of the rock-shaft 192 with the dog-arms 193 the levers 160 might effect the carrying from one registering-wheel to another during the setting-back operation; but with the employment of the dog-arms 193 the registering-wheels will be prevented from carrying from one to another during the operation of setting them back to their zero position.

In the employment of the register it is desirable that the owner thereof shall know when the totalizing-wheel 174 has turned to register "9," and to this end we provide, in connection with the guard-frame 112, a strip of paper 195, as shown more clearly in Figs. 15 to 20, inclusive, which will become punctured by the prong 196, secured to the totalizing-wheel 174, when the totalizing-wheel 174 has been turned to register "9," and the puncturing of the strip 195 by the prong 196 will denote that the machine has registered and added up to at least nine thousand dollars. The strip of paper 195 will be secured over the aperture in the guard-plate 112, through which the totalizing-wheel 174 may be observed, and hence the strip of paper 195 will be held in stationary position. The totalizing-wheel 174 makes only one rotation during the complete operation of the machine to register and add nine thousand nine hundred and ninety-nine dollars and ninety-nine cents, and hence when the owner of the machine discovers that the prong 196 on said wheel has punctured the paper 195 it will be an indication to him that the wheel 174 has completed a full operation.

We do not limit the invention to any special style of paper 195 to be punctured by the prong 196, carried by the totalizing-wheel 174, since any piece of paper located over said totalizing-wheel 174 will when the operative capacity of the said wheel has been reached be punctured by the prong 196. In order that the ability of the prong 196 to punch the paper 195 may be readily understood, it is to be remembered that the registering and totalizing wheels perform their rotation when in their lower position, (shown in Fig. 15,) and that thereupon said totalizing and registering wheels will ascend to their upper position, (shown in Fig. 16,) and it is when said wheels ascend to their upper position that the prong 196 is moved upward against and through the paper 195.

In the drawings, Figs. 15 to 20, inclusive, we illustrate the preferred form of paper 195 to be employed in connection with the prong 196 on the final totalizing-wheel 174, and in said figures it will be observed that the strip of paper 195 is of elongated outline and upon a plate 197, which has a handle 198 at one end and a lip 199 at the other end, said lip containing the aperture 200, which when the plate 197 is in position on the guard-frame 112, as shown in Fig. 17, is directly above the aperture 111 in said frame 112 above the last totalizing-wheel 174. The strip of paper 195 is applied upon the lip 199 of the plate 197 in the manner more clearly indicated in Figs. 17 and 19, in which it will be seen that the strip of paper 195 is folded against the outer edge of the lip 199 and that the left-hand end of said strip 196 is thereupon inserted downward through the aperture 200 in said lip and then below the right-hand portion of said lip, while the right-hand portion of said strip 195 is then passed below the lip 199 and against the left-hand end of said strip 195, and is then passed around the right-hand edge of said lip 199 and then folded toward the left upon the body of the strip of paper 199, where it is held by means of a layer of paste 201, (shown in Fig. 20,) whereby the strip of paper 199 becomes fastened to the plate 197 preparatory to the application of said plate 197 to the frame 112 in the position in which the same is shown in Fig. 17. In lieu of finally pasting down the right-hand end of the strip 195 before the plate 197 is applied upon the guard-frame 112 the pasting of the said end of said paper down upon the edge of the strip may be done after the plate 197 is applied to the guard-frame 112, and in such event the end of the strip of paper 195 having the paste 201 may be folded over the spring 202, by which the plate 197 is held upon the guard-frame 112, the spring 202 then becoming folded within the strip of paper 195, as shown in Figs. 17 and 19. The spring 202 is a wire spring fastened to the side of the guard-frame 112, and the end of the plate 197 may be slipped below it to enable the said spring 202 to hold said plate in position. The object of folding the right-hand end of the strip of paper 195 over the spring 202 in the manner shown in Figs. 17 and 19 is to render it substantially impracticable to remove the said strip of paper 195 from the machine without destroying it. The strip of paper 195 will not be removed from the machine until it has been punctured by the prong 196, carried by the totalizing-wheel 174, and said strip having been punctured it is proper that the same upon its removal from the machine be mutilated or destroyed. Another object in having the paper 195 folded over the spring 202 is to effect the mutilation of the paper 195 should any one not having authority attempt to move the same to a position where it would not in the proper employment of the register be punctured by the prong 196 at the completion of the rotation of the totalizing-wheel 174. The strip of paper 195 may also, as tending to further security, bear the name or autograph of the owner of the register, as indicated by the fictitious name in Fig. 20. We therefore prefer to apply an elongated strip of paper 195 to be punctured by the prong 196 and to secure the same upon a removable plate 197, adapted for application to the guard-frame 112, as shown in Fig. 17. When the owner opens the register-casing for the purpose of reading the totalizing and registering wheels, he will, if the paper 195 has been punctured, know that that puncture means nine thousand dollars, and it will be an easy matter for the owner of the register to remove the plate 197 and the remains of the strip 195, and thereupon he will apply a fresh strip 195 to the plate 197 and restore it upon the guard-frame 112.

The invention is not limited to any special fabric, shape, or form for the strip 195 nor to the technical use of a prong or pin 196 for leaving its impression on the strip 195; but this part of the invention is meant to broadly cover any means connected with or operated from the totalizing-wheels 174 for leaving its impression upon a piece of paper or other material when the totalizing-wheel 174 has reached the limit of its rotation.

Operation: The operation of the cash-register made the subject hereof has been so fully explained in connection with the description of the construction of the various parts of the mechanism that it would seem only necessary to refer briefly to the operation of the register as a whole at this place. The actuating or setting levers 53 are moved to set the segments 61, said segments 61 automatically following the levers 53 upward due to the action of the springs 65. The upward motion of the actuating-levers 53, also through the rack-bars 62, turns the indicating cylinders or drums 63, the said cylinders or drums then being in their lower position. (Shown in Fig. 8.) Thereafter the operator will take hold of the exposed crank or handle 76 and pull the same downward to the full limit of its movement, and thereby rotate the main driving-shaft 64 and the parts rigidly connected therewith, which results, among other things, in the elevation of the indicating cylinders or drums 63 to their exposure position. The rotation of the shaft 64 effects the lowering of the registering-wheel shaft 101 to carry the pinion-wheels 104 thereon into mesh with the then elevated segments 61 and also through the pins 150 on said shaft 64 the return of the segments 61 to their lower position, said segments at such time rotating the pinion-wheels 104 and the registering-wheels connected therewith. The rotation of the shaft 64 also results in the upward movement of the stop-arms 153, so that they may check the segments 61 when the latter shall have reached their normal downward position. When the exposed crank-handle 76 reaches its lower position, the gong 126 will sound, and the registering having been effected when the said crank-handle 76 reaches its lower position the said crank-handle will at once be returned to its upper position, the indicating cylinders or drums being left in their upper or exposure position. The upward movement of the crank-handle 76 effects a reverse rotation of the driving-shaft 64, and upon the return of the crank-handle 76 to its upper normal position the registering-wheel shaft 101 will elevate and carry its pinion-wheels 104 from the segments 61. The carrying from one registering-wheel to another is performed during the upward movement of the crank-handle 76 and after the stop-arms 153 descend to their lower or normal position. (Shown in Fig. 8.) During the reverse rotation of the driving-shaft 64 the pins 151 thereon, acting against the levers 161, will restore any of the carrying-sleeves 159 which have been turned by the fingers 157 of the disks 156 during the downward motion of the crank-handle 76. The setting-levers 53 are locked against motion during the downward and upward movements of the crank-handle 76 by means of the slide 187 and plate 190, the latter being on the driving-shaft 64; but when the crank-handle 76 reaches its upper position the setting-levers 53 will then be free to be moved to any extent desired. In the event of a subsequent sale the levers 53 will be moved, and upon the movement of any one of said levers 53 the indicating cylinders or drums 63 will be released to descend to their lower position, so that during the movement of the said levers 53 the said indicating cylinders or drums may be rotated while at their lower position to properly indicate the amount of the sale. After the movement of the levers 53, in the event of a subsequent sale, the crank-handle 76 will then be pulled downward to its lower position and pushed back to its upper position, as above, the downward pull of the said crank-handle 76 effecting registration and the elevation of the indicating cylinders or drums to their exposure position. At any time desired the owner of the register may open the front door 212 and inspect the registering-wheels, and thereafter return said wheels to their zero position by the rotation of the shaft 108 by means of the exposed knob or handle 110. When the last totalizing-wheel 174 has reached the full limit of its capacity, the prong 196 on the said totalizing-wheel 174 will puncture the strip of paper 195 to denote to the owner of the register that registration has taken place up to nine thousand dollars. The means for carrying from one registering-wheel to another has been fully described hereinbefore, and a further description thereof is unnecessary. The crank-handle 76 may be locked in its normal position by means of the latch-rod 141 in connection with the spring locking-bolt 143 or other suitable locking means, and the lower end of said crank-handle 76 may be locked upon the driving-shaft 64 by means of the plate 138, connected with the pawl-plate 134 and adapted to enter the annular groove 139 in the hub 140 of the said crank-handle 76. The locking-plate 138 and annular groove 139 are located within the register-casing, and hence cannot be reached when the upper end of the crank-handle 76 is locked in its normal position. It may be necessary, however, to remove the crank-handle 76 for the purpose of permitting the removal of the register-casing from over the interior mechanism of the register, and at such time the crank-handle 76 will be pulled forward slightly, so as to cause the pawl-plate 134 to carry the locking-plate 138 from the annular groove 139 in the hub 140 of said crank-handle 76, and when the crank-handle 76 has thus been pulled slightly forward the lower end of said handle may be removed from the shaft 64 and drawn outward through the side of the register-casing, leaving the latter then free to be elevated from the interior mechanism of the register.

It is not intended to limit this application to the details of construction further than said details may be specifically pointed out in the claims, and these details in their form and arrangement in the broader scope of this invention will be varied at will in accordance with the size of the register to be produced and the will of the manufacturer. The cash-register shown in the drawings is provided with four of the actuating or setting levers 53; but these in number will vary as occasion may require. When a less number than four of the levers 53 is used, the number of indicating cylinders or drums 63 and registering-wheels 100 will be reduced accordingly.

Without, therefore, limiting ourselves to details of construction or forms of parts other than as denoted in the claims, what we claim as our invention, and desire to secure by Letters Patent, is—

1. In a cash-register, the actuating hand-levers, the front plate having the series of slots along which said levers may be moved in accordance with the values to be indicated, the movable segments substantially independent of but adapted to automatically follow said levers and to have their positions controlled thereby, the registering-wheels, the gear connected therewith, the indicating cylinders or drums having the pinion-wheels connected therewith, and the rack-bars connected with said actuating hand-levers and in engagement with the gear-wheels on said indicating cylinders or drums, combined with means for bringing said registering-wheel gears into engagement with said segments after the latter have reached their predetermined operative position, the exposed crank or handle for thereafter moving said segments to rotate said registering-wheels and return said segments to their normal position, means operable from said crank-handle to elevate the said indicating cylinders or drums to their exposure position, and means for thereafter returning said registering-wheels and their gear to their normal position free of said segments, leaving said indicating cylinders or drums in their upper or exposure position, substantially as set forth.

2. In a cash-register, the actuating hand-levers the front plate having the series of slots along which said levers may be moved in accordance with the values to be indicated, the indicating cylinders or drums, the gear-wheels connected therewith, the rack-bars connected with said actuating hand-levers and in mesh with said gear-wheels for operating the latter and the indicating cylinders or drums with each movement of said actuating hand-levers, the shaft supporting said indicating cylinders or drums, and vertically-movable means for supporting said shaft, combined with the register-casing having the window-opening, the exposed crank-handle and means operable from said crank-handle for elevating the said indicating cylinders or drums to expose the indication through said window-opening, substantially as set forth.

3. In a cash-register, the actuating hand-levers, the front plate having the series of slots along which said levers may be moved in accordance with the values to be indicated, registering means, the indicating cylinders or drums, the gear-wheels connected therewith, the rack-bars connected with said actuating hand-levers and in engagement with the said gear-wheels for operating the said indicating cylinders or drums upon the movement of said actuating hand-levers, the shaft for said indicating cylinders or drums, and vertically-movable means for supporting said shaft, combined with the exposed crank-handle for effecting registration after said actuating hand-levers shall have been moved, means operable from said crank-handle for elevating said indicating cylinders or drums to their exposure position upon the movement of said exposed crank-handle to effect registration, and means for supporting said indicating cylinders or drums in their exposure position upon the return of said crank-handle to its normal position; substantially as set forth.

4. In a cash-register, the actuating hand-levers, the front plate having the series of slots along which said levers may be moved in accordance with the values to be indicated, registering means, the indicating cylinders or drums, the gear-wheels connected therewith, the rack-bars connected with said actuating hand-levers and in engagement with said gear-wheels for rotating said cylinders or drums upon the movement of said hand-levers, the shaft supporting said cylinders or drums, and vertically-movable means for supporting said cylinders or drums, combined with the exposed crank-handle for effecting registrations, means operable from said crank-handle for elevating said indicating cylinders or drums to their exposure position when said crank-handle is moved to effect registration, means for supporting said cylinders or drums in their exposure position upon the return of said crank-handle to its normal position, and means operable by the movement of any of said actuating hand-levers for relieving said support from the said indicating cylinders or drums so that the latter may thereupon return to their lower normal position; substantially as set forth.

5. In a cash-register having the window-openings to expose the indication, the rotary indicating cylinders or drums, the actuating hand-levers, means intermediate said hand-levers and said indicating cylinders or drums for rotating the latter from said hand-levers, and a vertically-movable support for said indicating cylinders or drums, combined with registering means, the exposed operating crank-handle for effecting registration, and means operable from said crank-handle for moving said indicating cylinders or drums, after their rotation, to their exposure position; substantially as set forth.

6. In a cash-register, the rotary indicating cylinders or drums, the actuating hand-levers, means intermediate said levers and said indicating cylinders or drums for rotating the latter from said levers when said indicating cylinders or drums are in their concealed position, and vertically-movable means for supporting said indicating cylinders or drums, combined with registering means, the exposed operating crank-handle for effecting registration, means operable from said crank-handle for elevating said indicating cylinders or drums, after their rotation, to their exposure position, and means for supporting said indicating cylinders or drums in their exposure position after said crank-handle has been returned to its normal position; substantially as set forth.

7. In a cash-register, the rotary indicating cylinders or drums, the actuating hand-levers, means intermediate said hand-levers and said indicating cylinders or drums for operating the latter from said hand-levers, and a movable support for said indicating cylinders or drums, combined with registering means, the exposed operating crank-handle for effecting registration, means operable from said crank-handle for moving said indicating cylinders or drums to their exposure position when said crank-handle is moved to effect registration, means for supporting said indicating cylinders or drums in their exposure position after said crank-handle is returned to its normal position, and means operable from any of said actuating hand-levers for releasing the support from said indicating cylinders or drums so that the latter may upon any subsequent movement of any of said hand-levers return to their concealed position; substantially as set forth.

8. In a cash-register, the actuating hand-levers, the rotary vertically-movable indicating cylinders or drums, the gear-wheels connected therewith, the rack-bars connected with said actuating hand-levers and in engagement with said gear-wheels for rotating said cylinders or drums, auxiliary bars 92 carried by said rack-bars, and the connected pawls 91 adapted to engage said auxiliary bars, combined with registering means, the exposed operating crank-handle for effecting registration, and means operable from said crank-handle for moving to their exposure position the said indicating cylinders or drums, after the rotation of the latter, and means connected with said pawls for supporting said indicating cylinders or drums in their exposure position after said operating crank-handle has been returned to its normal position, the said supporting means being adapted to be relieved from said indicating cylinders or drums so that the latter may retire to their concealed position by the movement of said auxiliary bars against said pawls; substantially as set forth.

9. In a cash-register, the rotary and vertically-movable indicating cylinders or drums, the gear-wheels connected therewith, the actuating hand-levers, the rack-bars connected with said hand-levers and in engagement with said gear-wheels for rotating said indicating cylinders or drums, the toothed auxiliary bars 92 carried by the said rack-bars, the rock-shaft 90 having the pawls 91 to engage said toothed bars 92, the dog 86 rigid on said shaft 90 with said pawls 91, and a spring whose tension is exerted to pull said pawls 91 and dog 86 in a direction toward said toothed bars 92, combined with registering means, the exposed operating crank-handle for effecting registration, and means operable from said crank-handle for moving said indicating cylinders or drums to their exposure position when said crank-handle is moved to effect registration, the said dog 86 being adapted to support said indicating cylinders or drums in their exposure position after the return of said crank-handle to its normal position, and said auxiliary bars 92 and pawls 91 being adapted when thereafter any of said actuating hand-levers are moved to release said dog 86 so that said indicating cylinders or drums may return to their concealed position; substantially as set forth.

10. In a cash-register, the actuating hand-levers, the rotary indicating cylinders or drums, the gear-wheels connected therewith, the rack-bars connected with said actuating hand-levers and in engagement with said gear-wheels for rotating said indicating cylinders or drums from said hand-levers, the shaft upon which said indicating cylinders or drums are mounted, and the vertically-movable bar 80 connected with said shaft, combined with registering means, the driving-shaft 64, the exposed crank-handle on the end thereof, the lever 84 on said driving-shaft and adapted to engage the lower end of said vertically-movable bar 80 for elevating the latter and said indicating cylinders or drums when said crank-handle is moved to effect registration, and means for supporting the indicating cylinders or drums in their exposure position upon the return of said exposed crank-handle and said lever 84 to their normal position; substantially as set forth.

11. In a cash-register, the actuating hand-levers, the indicating cylinders or drums, the gear-wheels thereon and the rack-bars connected with said hand-levers and in engagement with said gear-wheels for rotating said indicating cylinders or drums from said hand-levers, combined with the vertically-movable bar 80 connected with the shaft of said indicating cylinders or drums, means for guiding said bar 80 and said shaft in their vertical movements, the driving-shaft 64, registering means, the exposed crank-handle on the end thereof, the lever 84 on said driving-shaft for engaging the lower end of said bar 80 and elevating the same with the indicating cylinders or drums when said crank-handle is moved to effect registration, the spring-dog 86 for engaging said bar 80 when the latter is in its elevated position, and means operable from any of said actuating hand-levers for releasing the said dog from the said bar 80 to permit of the movement of said indicating cylinders or drums to their concealed position; substantially as set forth.

12. In a cash-register, the actuating hand-levers, the indicating cylinders or drums, the gear-wheels connected therewith, and the rack-bars connected with said actuating hand-levers and in engagement with said gear-wheels for rotating said indicating cylinders or drums and the said hand-levers, combined with the vertically-movable bar 80 connected with the shaft of said indicating cylinders or drums, means for guiding said bar 80 and said shaft during their vertical movement, the inclined plate 88 at the upper end of said bar 80, the rock-shaft 90 in rear of said bar 80 and carrying the dog 86 and pawls 91, a spring drawing said pawls and dog in a direction toward said bar 80, the toothed bars 92 carried by said rack-bars for engagement with said pawls 91, registering means, the driving-shaft 64, the exposed crank-handle thereon for effecting registration, and the lever-arm 84 on said driving-shaft for engagement with the lower end of said vertically-movable bar 80 to elevate the latter and said indicating cylinders or drums when said driving-shaft is operated by said crank-handle to effect registration, said dog 86 when the bar 80 is in its upper position being adapted to engage and support the same, and said inclined plate 88 being adapted to engage said dog 86 when the indicating cylinders or drums are in their lower position so as to keep the pawls 91 from contact with the said toothed bars 92 during the rotation of said indicating cylinders or drums under the action of said hand-levers; substantially as set forth.

13. In a cash-register, the actuating hand-levers, the front plate having a series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank-handle for thereafter moving said segments against said gearing to rotate said registering-wheels and return said segments to their normal position, the stop-arms also operable from said crank-handle for arresting said segments when they reach their normal position and adapted thereafter to move from said segments, and means operable from the registering-wheels to effect, independently of said segments, the carrying from one registering-wheel to another while said gearing is in engagement with said segments; substantially as set forth.

14. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank-handle for thereafter moving said segments against said gear to rotate said registering-wheels and return said segments to their normal position, the stop-arms 153 connected with the rock-shaft 152 and normally below the zero position of said segments, means operable from said crank-handle for elevating said stop-arms 153 into a position to arrest said segments on their return motion to their normal position, means for thereafter returning said stop-arms to their normal position below said segments, and means independent of said segments for effecting the carrying from one registering-wheel to another while said gearing is in engagement with said segments; substantially as set forth.

15. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank-handle for thereafter moving said segments against said gearing to rotate said registering-wheels and return said segments to their normal position, the series of levers 160 having the pawls 164 in engagement with said gear-wheels, springs connected with said levers and adapted when not restrained to move said pawls against said gear-wheels preparatory to rotating the registering-wheels, as in the operation of carrying from one registering-wheel to another, means holding said levers 160 and their springs in restraint, except when carrying is to be performed, means for driving said pawls against said gear-wheels to rotate the registering-wheels to perform the carrying, and means connected with the registering-wheels for releasing said levers 160 at each rotation of the registering-wheels to enable said levers 160 with the pawls carried thereby to effect the rotation in series of the registering-wheels; substantially as set forth.

16. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank-handle for thereafter moving said segments against said gearing to rotate said registering-wheels and return said segments to their normal position, the series of levers 160 having the pawls 164 in engagement with the said gear-wheels, the springs 166 connected with said levers 160, movable means engaging said levers 160 for holding the latter stationary in opposition to the force of said springs 166, means connected with the registering-wheels for releasing said levers 160 at each rotation of the registering-wheels for enabling the springs 166 to set said pawls 164 and said levers 160 into operative position for performing the carrying, and means for driving said pawls against said gear-wheels to thereby rotate said registering-wheels; substantially as set forth.

17. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank-handle for thereafter moving said segments against said gearing to rotate said registering-wheels and return said segments to their normal position, the series of pivoted levers 160 having pawls 164 in engagement with the said gear-wheels, the springs 166 connected with said levers 160, the rotary sleeves 159 in engagement with the said levers 160 for normally restraining them in opposition to the force of the said springs 166, means connected with the registering-wheels for rotating said sleeves 159 to release said levers 160, and means for thereafter driving said pawls 164 against said gear-wheels to rotate said registering-wheels and effect the carrying; substantially as set forth.

18. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gearing connected therewith, combined with means for bringing said gearing into engagement with said segments after the latter have reached their predetermined operative position, the exposed crank-handle for thereafter moving said segments against said gearing to rotate said registering-wheels and return said segments to their normal position, the series of pivoted levers 160 having pawls 164 in engagement with the said gear-wheels, the springs 166 connected with said levers 160, the rotary sleeves 159 in engagement with the said levers 160 for normally restraining them in opposition to the force of said springs 166, means connected with the registering-wheels for rotating said sleeves 159 from said levers 160 so as to permit of the movement of the latter under the force of the springs 166, means operable from said crank-handle for driving said pawls against said gear-wheels to rotate said registering-wheels and perform the carrying, and means operable from said crank-handle for restoring said rotary sleeves to their normal position in relation to said levers 160, whereby said sleeves may again hold said levers 160 in restraint and in their normal inoperative position; substantially as set forth.

19. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gearing connected therewith, combined with means for bringing said gearing into engagement with said segments after the latter have reached their predetermined operative position, the exposed crank-handle for thereafter moving said segments against said gearing to rotate said registering-wheels and return said segments to their normal position, the series of pivoted levers 160 having pawls 164 in engagement with said gear-wheels, the springs 166 connected with said levers 160, the rotary sleeves 159 in engagement with the said levers 160 for normally restraining them in opposition to the force of the said springs 166, means connected with the registering-wheels for relieving said rotary sleeves 159 from said levers 160 to permit the latter under the force of the springs 166 to be moved to a position preparatory for carrying from one registering-wheel to another, means for then driving said pawls against said gear-wheels to perform the carrying, the series of levers 161 having the arms 171, and the driving-shaft 64 to which said crank-handle is connected and having the pins 151 for engagement with said levers 161 said pins 151 being adapted to elevate said levers 161 and to cause the arms 171 on said levers to restore said rotary sleeves 159 to their normal position in relation to said levers 160 for holding the latter in restraint; substantially as set forth.

20. In a cash-register, the actuating hand-levers, the front plate having a series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank or handle for thereafter moving said segments against said gearing to rotate said registering-wheels and return said segments to their normal position, the series of pivoted levers 160 having the shoulders 167 and also having the pawls 164 in engagement with said gear-wheels, the springs 166 connected with said levers 160, the rotary sleeves 159 having at one end the shoulder to engage the shoulder 167 on said levers 160 for restraining the latter in opposition to the springs 166 and having at their other end the shoulder 170, means connected with the registering-wheels for engaging said shoulders 170 upon each rotation of the registering-wheels to move said rotary sleeves from their engagement with said shoulder on said levers 160 and thereby permit the springs 166 to actuate said levers 160, and means for then driving said pawls against said gear-wheels to rotate the registering-wheels and perform the carrying; substantially as set forth.

21. In a cash-register, the actuating hand-levers, the front plate having the series of slots along which said levers may be moved in accordance with the values to be indicated, the movable segments substantially independent of but adapted to automatically follow said levers and to have their position controlled thereby, the registering-wheels, and the gear connected therewith, combined with means for bringing said gearing into engagement with said segments after the latter have reached their predetermined operative position, the exposed crank-handle for thereafter moving said segments against said gearing to rotate said registering-wheels and return said segments to their normal position, the driving-shaft to which said crank-handle is connected and which is provided with pins 151, the series of levers 160 having the shoulders 167 and carrying the pawls 164 in engagement with said gear-wheels, the springs 166 connected with said levers 160, the rotary sleeves 159 having at one end the shoulder 169 for engagement with the shoulder 167 of said levers 160 for restraining the latter in opposition to the force of said springs 166 and having at their other end the shoulder 170, means connected with said registering-wheels for engaging on each rotation of the latter the said shoulder 170 and moving said rotary sleeves to release said levers 160 for permitting the carrying from one registering-wheel to another, means for actuating said pawls to perform the carrying and the levers 161 below said sleeves 159 and having the arms 171 in line with the lower surface of said shoulders 170, the said arms 171 during the return motion of said crank-handle being adapted on the elevation of said levers 161 by means of said pins 151 to engage the lower surface of said shoulders 170 and restore said sleeves 159 to their normal position in engagement with the said levers 160, for again restraining the latter in opposition to the force of said springs 166, substantially as set forth.

22. In a cash-register, the registering-wheels, the gear-wheels connected therewith, and gearing for rotating said gear-wheels to effect the rotation of said registering-wheels, combined with the levers 160 having the shoulders 167 and carrying the pawls 164 in engagement with said gear-wheels, the springs 166 connected with said levers 160, the rotary sleeves 159 having at one end the shoulder 169 to engage the shoulder 167 on said levers 160 and thereby hold said levers 160 in an inactive condition in opposition to the force of said springs 166, means connected with the registering-wheels for moving, on each rotation of said registering-wheels, the said rotary sleeves for releasing the shoulder 169 from the said shoulder 167 and permitting said springs 166 to move the levers 160 preparatory to carrying being performed, and means for then driving said pawls against said gear-wheels to rotate the registering-wheels as in carrying from one wheel to another in series; substantially as set forth.

23. In a cash-register, the registering-wheels, the gear-wheels connected therewith, and the gearing in mesh with said gear-wheels for rotating said registering-wheels, combined with the series of levers 160 carrying the pawls 164 in engagement with said gear-wheels, the springs 166 connected with said levers 160, the rotary sleeves 159 having at one end the shoulder 169 to engage said levers 160 and hold the latter in restraint in opposition to the force of said springs 166, and having at their other end the shoulder 170, means connected with the registering-wheels for engaging, at each rotation of the latter, the said shoulder 170 for moving said sleeves to release said levers 160, thereby to permit the carrying from one registering-wheel to another the driving-shaft, and means operable from the said driving-shaft of the register for then moving said pawls to perform the carrying; substantially as set forth.

24. In a cash-register, the registering-wheels, the gear-wheels connected therewith, and the gearing in mesh with said gear-wheels for rotating said registering-wheels, combined with the pivoted levers 160 carrying the pawls 164 for engagement with said gear-wheels to rotate said registering-wheels, the springs 166 connected with said levers 160, the rotary sleeves 159 having at one end the shoulder to engage and hold in restraint said levers 160, and having at the other end a shoulder 170, means connected with the registering-wheels for engaging, at each rotation of the latter, the said shoulder 170 for moving said sleeves to release said levers 160, the driving-shaft, and means connected with the said driving-shaft of the register for thereafter moving said pawls to perform the carrying and for engaging said sleeves to restore them to their normal position in engagement with and for restraining said levers 160; substantially as set forth.

25. In a cash-register, the registering-wheels, the gear-wheels connected therewith, and gearing for rotating said gear-wheels to operate said registering-wheels, combined with the series of levers 160 having the pawls 164 for engaging said gear-wheels to rotate said registering-wheels a distance equal to one space thereof, the rotary sleeves 159 having at one end the shoulder 169 to engage and hold in restraint said levers 160, and having at their other end the shoulder 170, means connected with the registering-wheels to contact, at each rotation of the latter, with said shoulder 170 for moving said sleeves to release said shoulder 169 from the said levers 160, so that the latter may effect the carrying, means for then driving said pawls against said gear-wheels to perform the carrying, the pivoted levers 161 below said sleeves 159 and having the arms 171, the driving-shaft, and means connected with the said driving-shaft of the register for moving said arms 171 against the said sleeves 159 to restore the latter to their normal position in engagement with said levers 160 for again holding the latter in restraint; substantially as set forth.

26. In a cash-register, the registering-wheels, the gear-wheels connected therewith, and gearing for engaging said gear-wheels to rotate said registering-wheels, combined with the series of levers 160 having the pawls 164 to engage said gear-wheels for effecting the carrying from one registering-wheel to another, the springs connected with said levers 160, shoulders for engaging said levers 160 to hold the latter in restraint in opposition to the force of said springs, means connected with the registering-wheels for removing said shoulders from said levers 160 at each rotation of said registering-wheels, the setting-back shaft 108 having the series of gear-wheels 109 thereon, the gear-wheels 105 connected with said registering-wheels, and dog-arms 193 to engage said levers 160 during the rotation of said gear-wheels 109 and 105 to restore said registering-wheels to their zero position, the said dog-arms 193 acting to restrain the levers 160 against movement during such setting-back operation; substantially as set forth.

27. In a cash-register, the registering-wheels, the gear-wheels 104 connected therewith, gearing for engaging said gear-wheels to operate said registering-wheels, the driving-shaft from which said gearing is operated, and the exposed crank-handle for operating said shaft, combined with the series of pivoted levers 160 carrying the pawls 164 for engaging said gear-wheels 104 to rotate said registering-wheels in the operation of carrying from one registering-wheel to another, the springs 166 connected with said levers 160, the shoulders for holding said levers 160 in restraint in opposition to the force of said springs 166, means carried by said registering-wheels for releasing, at each rotation of the registering-wheels, the said shoulders from the said levers 160, the setting-back shaft 108 carrying the gear-wheels 109, the gear-wheels 105 connected with the said registering-wheels and in mesh with said gear-wheels 109, and the rock-shaft 192 having dog-arms 193 to engage and hold in restraint the levers 160 during the operation of the said setting-back shaft 108, and also having the lever-arm 194 operable from said driving-shaft for moving said dog-arms 193 to restrain said levers 160 when said crank-handle is moved to its normal position; substantially as set forth.

28. In a cash-register, the tens-of-dollars registering-wheel; the totalizing-wheels 173 and 174, the gear-wheels connected therewith, and the pivotally-mounted plates 176 having the arms 177 and 178 encompassing the lower portions of said gear-wheels, and also having the teeth 179 to engage the teeth of said gear-wheels, and also having the lips 181, combined with the arms 157 carried by the tens-of-dollars registering-wheel and the first totalizing-wheel to engage the lips 181 of the plates 176 to move the latter and cause the teeth 179 thereof to engage the teeth of the said gear-wheels for rotating said totalizing-wheels, in carrying to the first totalizing-wheel and from that wheel to the second totalizing-wheel, means for elevating said gear-wheels from said plates 176 after the latter have been moved by the arms 157, and the springs for then restoring the said plates 176 to their normal position; substantially as set forth.

29. In a cash-register, the registering and totalizing wheels, gearing for operating the same, and means for carrying from one to the other of the said wheels, combined with a piece of fabric, and means operable from the last totalizing-wheel to make an impression on said piece of fabric when said wheel has reached the limit of a predetermined extent of its rotation; substantially as set forth.

30. In a cash-register, the registering and totalizing wheels, gearing for operating the same, and means for effecting the carrying from one of said wheels to the other in series, combined with the prong connected with the last totalizing-wheel, and a piece of fabric to be acted on by said prong when the last totalizing-wheel has reached the limit of a predetermined extent of its position; substantially as set forth.

31. In a cash-register, the registering and totalizing wheels, the shaft therefor, gearing for operating said wheels, means for effecting the carrying from one of said wheels to the other in series, and means for moving said wheels from an upper inoperative position to a lower operative position, combined with a piece of fabric located above the last totalizing-wheel, and means connected with said totalizing-wheel for making an impression on said fabric when said wheel has reached the limit of a predetermined extent of its motion and is moved to its upper inoperative position; substantially as set forth.

32. In a cash-register, the registering and totalizing wheels, the shaft therefor, gearing for operating said wheels, means for effecting the carrying from one of said wheels to the other in series, and means for moving said wheels from an upper inoperative position to a lower operative position, combined with the prong secured to the last totalizing-wheel, and the piece of fabric above said totalizing-wheel and in position to be punctured by said prong when said registering and totalizing wheels are moved to their said inoperative position and have reached the limit of a predetermined extent of their motion; substantially as set forth.

33. In a cash-register, the registering and totalizing wheels, the shaft therefor, gearing for operating said wheels, means for effecting the carrying from one of said wheels to the other in series, and means for moving said wheels from an upper inoperative position to a lower operative position, combined with the prong secured to the final totalizing-wheel, and the strip of paper 195 to be punctured by said prong when the registering and totalizing wheels are moved to their upper inoperative position and have reached the limit of a predetermined extent of their rotation, said strip of paper being applied over the usual aperture in the customary guard-frame 112 above the registering and totalizing wheels; substantially as set forth.

34. In a cash-register, the registering and totalizing wheels, the shaft therefor, gearing for operating said wheels, means for effecting the carrying from one of said wheels to the other in series, and means for moving said wheels from an upper inoperative position to a lower operative position, combined with the prong 196 secured upon the last totalizing-wheel, the strip of paper 195 to be punctured by said prong when the registering and totalizing wheels are moved to their upper inoperative position and have reached the limit of a predetermined extent of their motion, and the plate 197 having the aperture 200 over which said strip 195 is applied, said strip 195 being folded around the lip 199 of said plate 197 and over the aperture 200 therein, and said strip having at one end adhesive substance 201, whereby it may be secured upon said lip; substantially as set forth.

35. In a cash-register, the registering and totalizing wheels, the gearing for operating said wheels, the driving-shaft for operating said gearing, the exposed crank-handle on the end of said shaft, and the casing inclosing the register mechanism and having an aperture in its side through which the hub of said crank-handle extends to reach said driving-shaft, combined with means within said casing for locking said hub of said crank-handle upon said shaft, and means operable from said crank-handle for relieving said hub from said locking means when said crank-handle is not in its normal position, thereby to permit the removal of said crank-handle from said shaft; substantially as set forth.

36. In a cash-register, the registering and totalizing wheels, the gearing for operating said wheels, the driving-shaft for operating said gearing, the exposed crank-handle on the end of said shaft, and the casing inclosing the register mechanism and having an aperture in its side through which the hub of said crank-handle extends to reach said driving-shaft, combined with a pivoted plate 138 within the register-casing for engaging said hub and locking said crank-handle upon said shaft, and means operable from said crank-handle for moving said plate 138 from said hub when said crank-handle is moved from its normal position; substantially as set forth.

Signed at New York, in the county and State of New York, this 25th day of September, 1900.

ELMER S. SMITH.
     HARVEY GILES.

Witnesses:
 CHAS. C. GILL,
 GUNDER GUNDERSON.